3,320,196
COATING COMPOSITION COMPRISING A TER-
POLYMER, AN ALKALI SOLUBLE RESIN, AND
A ZIRCONYL-FUGITIVE LIGAND COMPOUND
John R. Rogers, Racine, Wis., assignor to S. C. Johnson
& Son, Inc., Racine, Wis.
Filed Aug. 30, 1965, Ser. No. 483,424
9 Claims. (Cl. 260—27)

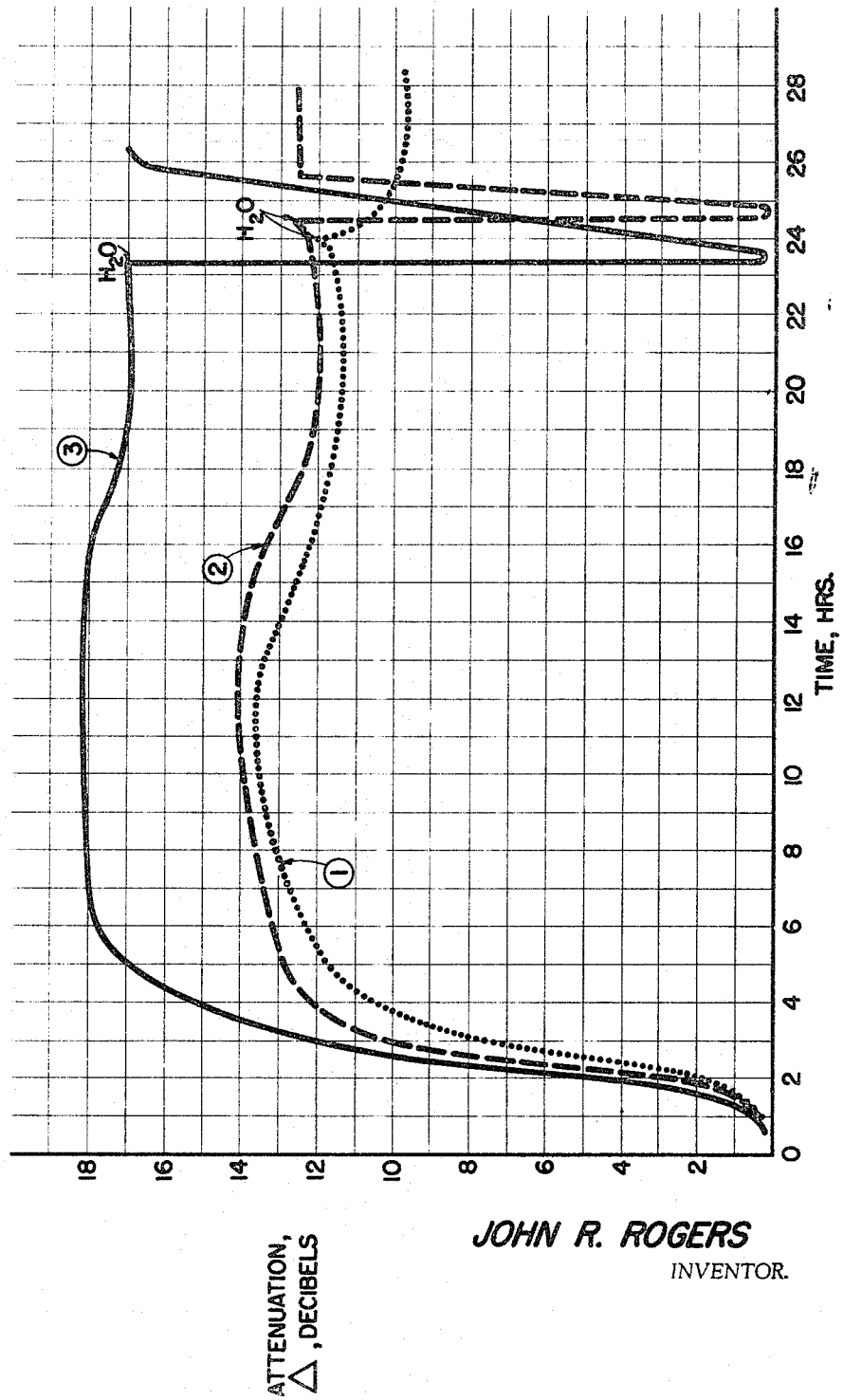

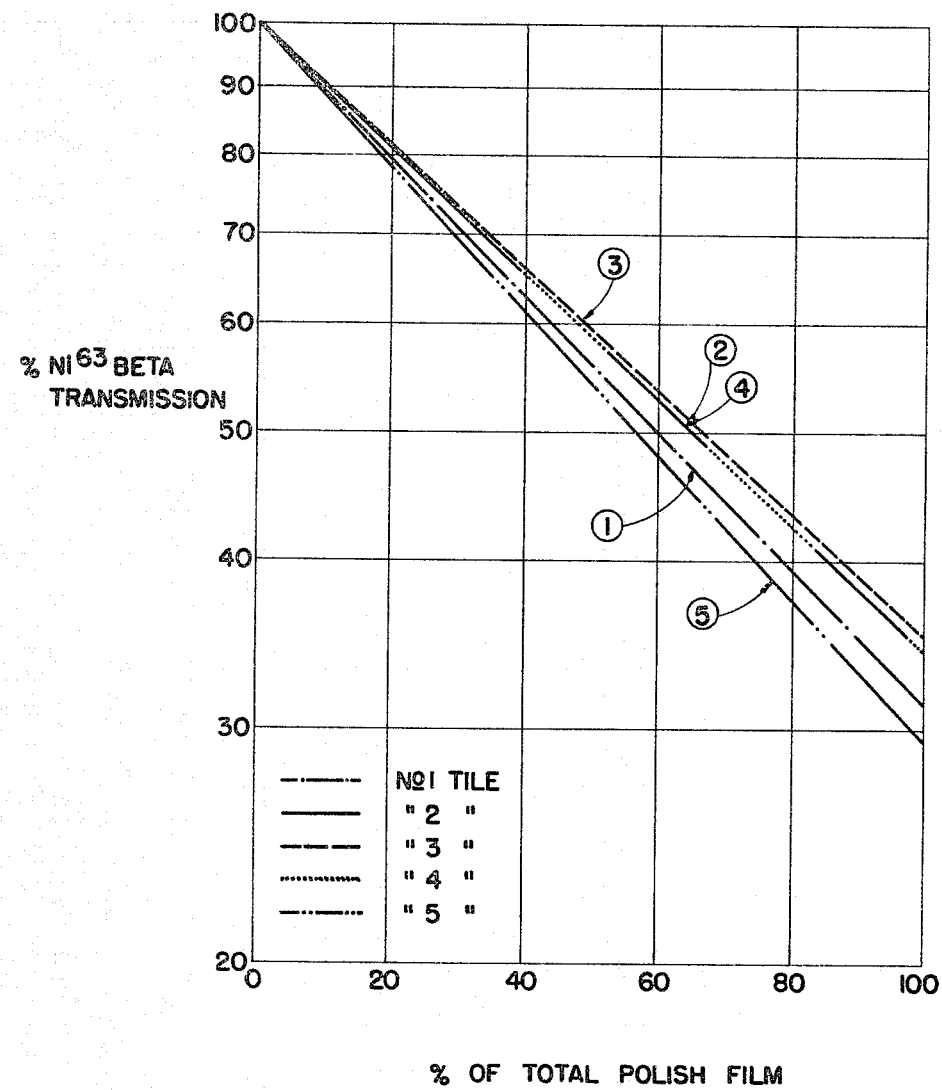

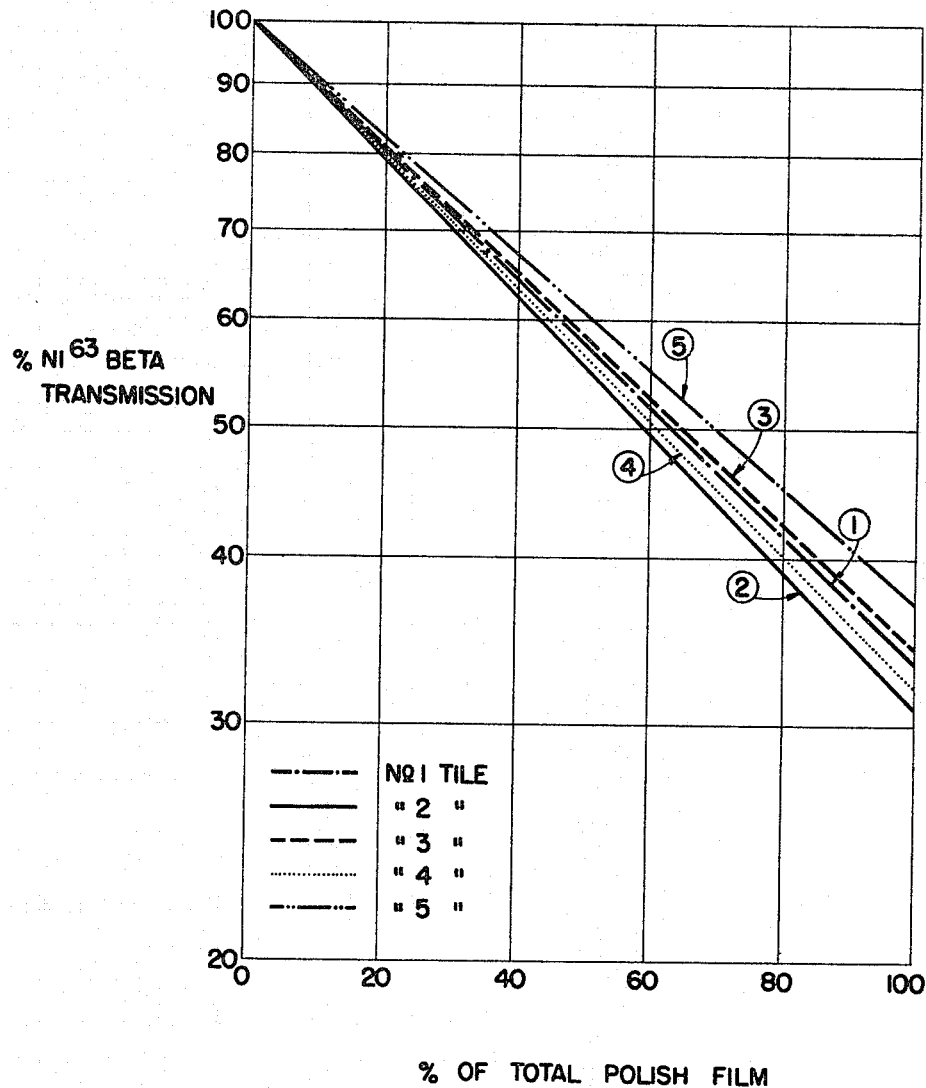

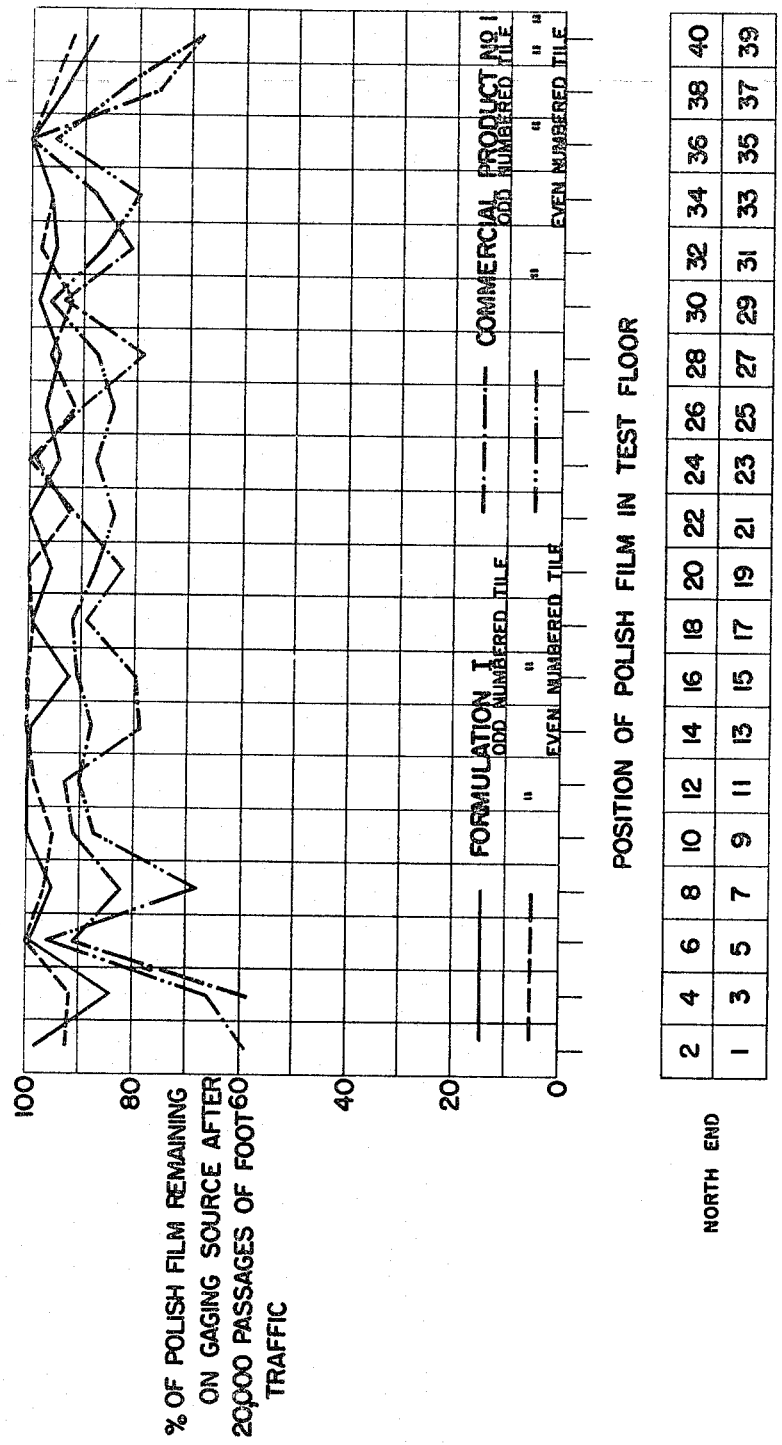

The present application is a continuation-in-part of my co-pending application Ser. No. 393,032 entitled, Coating Composition, filed Aug. 31, 1964, now abandoned.

The present invention relates to stable, aqueous coating compositions, to the films produced from these compositions, and to methods of removing these films from substrates. More particularly, this invention relates to improved stable aqueous coating compositions containing a polymer, a resin, and a zirconyl-containing complex, to the unique films obtained from these compositions, and to the methods of removing these films.

In the protective coating field, such as temporary organo coatings including certain floor coatings, it is desirable to have minimum carboxyl functionality present in order to avoid the solubilizing and spotting effects normally obtained when water, detergents, various alkaline and other carboxyl-reactive substances are brought into contact with such coatings. However, the hardness, durability, gloss, and removability properties of certain films are affected by the degree of carboxyl functionality present. Therefore, most coating compositions developed heretofore represent a compromise with respect to properties such as hardness, durability, gloss, removability, and resistance.

It has been found that various organic films containing carboxyl functionality, sufficient to obtain easy removal, tend, upon aging, to undergo a degrading effect, i.e., loss of functionality and/or physical rearrangement which renders the carboxyl groups substantially unavailable. This degrading effect produces films which are difficult to remove by means of conventional film remover substances such as detergents and results in film build-up. Film build-up is usually accompanied by degradation in color, i.e., yellowing, and eventually necessitates complete film removal with highly caustic solutions or solutions containing organic solvents or by various abrasive methods, all of which have been found to affect the substrate adversely.

The present invention is directed to stable, aqueous coating compositions which provide zirconyl-containing organic films having:

(1) Unique structural integrity as evidenced by their resistance to substances such as water, detergents, mild alkali, and various organic materials;
(2) Captive functional groups which are not degraded;
(3) Controlled removability; and
(4) High gloss, hardness, and durability.

COATING COMPOSITIONS

The coating compositions of the present invention are stable, aqueous compositions having a pH ranging from greater than about seven to about nine. These compositions comprise a liquid, organic film former containing:

a polyligand emulsion polymer described in detail infra,
a low molecular weight, polyligand, alkali soluble resin; and
a stable, zirconyl-fugitive ligand complex.

More particularly, the instant invention is directed to stable, aqueous liquid coating compositions having a pH from greater than seven to about nine comprising:
A. An organic film former containing:

(1) a polyligand emulsion polymer having a minimum film forming temperature (hereinafter referred to as MFT) of less than about 80° C. containing:
  (a) a stabilizing amount of a methacrylate monomer
  (b) a ligand-containing, polymerizable, ethylenically unsaturated monomer, and
  (c) a ligand-free, polymerizable, ethylenically unsaturated monomer which is free from methyl groups on the alpha carbon atom, and
(2) a low molecular weight, polyligand, alkali soluble resin having an acid number from about 140 to about 300; and B. A zirconyl-fugitive ligand complex which is capable of undergoing ligand exchange with at least some of the ligands of the polymer and the resin.

It is essential that the coating compositions of the invention are stable. That is, in order to obtain the film of the invention these coating compositions must be substantially free from gelation and/or precipitation and have substantially the same composition throughout.

For the purposes of the present invention, a stable, aqueous coating composition is defined as a fluid substance which can be stored for prolonged periods and is: (a) substantially free from gelling, (b) substantially free from changes in viscosity, and/or (c) substantially free from changes in the particle size of the dispersed solids. The stability of coating compositions can be monitored by periodic optical density measurements. For example, the optical density of the coating compositions of the present invention has been observed after varying periods of storage at elevated temperatures, i.e., about 51° C. The optical density of these coating compositions is obtained by using a Bausch and Lomb Spectronic 20 Colorimeter with 2.5 ml. of the coating composition diluted to 100 ml. with deionized water. This is approximately equivalent to about 0.37 g. of solid per 100 ml. of deionized water. The wave length of the light source is 500 millimicrons. It has been found that the stable coating compositions of the invention are substantially free from changes in viscosity and have a difference in optical density after seven days at about 51° C. of no greater than about 0.1. In a preferred embodiment, the difference in optical density of stable coating compositions under substantially similar conditions is less than about 0.03. These optical density observations are discussed in various examples below.

Mixtures of: many polyligand polymers and water, certain alkali soluble polyligand resins and water and various zirconyl-fugitive ligand complexes and water, are sufficiently stable so as to be useful in coating compositions. However, when various polyligand polymers, alkali soluble polyligand resins and zirconyl-fugitive ligand complexes are mixed together in water, they often form unstable mixtures. It is believed that this instability is due at least in part to inter- and intra-molecular bonding occurring between the zirconyl ions and the polymer and/or resin, resulting in gelation, increase in particle size and/or precipitation.

The present invention is directed to unique and novel coating compositions comprising certain types of polymers, certain types of resins and zirconyl-fugitive ligand complexes which are unexpectedly stable in water.

The stability of the aqueous coating compositions of the invention is particularly unobvious and unexpected since these compositions produce films upon drying which are characterized by substantial inter- and intra-molecular bonding between the ligands of the film former and the zirconyl ions. Such bonding would also be expected to take place in the liquid coating compositions. Although apparently some zirconyl-ligand bonding does occur in the liquid coating compositions of the invention the extent of this bonding is unexpectedly controlled and is not sufficient to cause substantial gelation, substantial changes in viscosity and/or substantial differences in optical density as discussed above.

The various components of the coating compositions will be discussed in detail below along with the unique and novel films of the invention and methods of removing same.

ORGANIC FILM FORMER

The organic film former can be defined as a mixture of a polyligand resin and a polyligand polymer which is stable in the aqueous coating compositions of the invention. Additionally, the organic film former is characterized by its ability in the presence of zirconyl ions to form a zirconyl-containing film characterized by unique structural integrity, controlled removability and containing captive ligands. These properties of the film are discussed in detail infra. The unique properties of the film are attributed, at least in part, to the presence of functional groups, i.e., ligands of the polymer and resin. That is, ligands play a key role in the ligand transfer and zirconyl bonding which is required during film formation. The resulting zirconyl-ligand bonds contribute substantially to film resistance and to film removal.

The weight ratio of resin to polymer in the organic film-former of the invention can range from about 20:80 to about 90:10. In a preferred embodiment, the ratio can be from about 30:70 to about 50:50.

The organic film former contains a mixture of resin and polymer or mixtures of various resins and various polymers. The resin and polymer components are discussed in detail below.

POLYMER

The polyligand, emulsion polymer suitable as a component of the organic film former has an MFT of less than about 80° C. and contains:

(a) a stabilizing amount of a methacrylate monomer,
(b) a ligand-containing, polymerizable, ethylenically unsaturated monomer; and
(c) a ligand-free, polymerizable, ethylenically unsaturated monomer which is free from methyl groups on the alpha carbon atom.

Polymers suitable for the coating compositions of the present invention are characterized by their stability in the alkaline, aqueous coating compositions of the invention containing resin and certain zirconyl-fugitive ligand complexes. These polymers have limited solubility in the coating compositions of the invention. Therefore a major amount of the polymer is present as a stable dispersion of emulsified particles. The unique stability of these dispersed polymer particles in the liquid coating compositions is attributed to the monomer components, the emulsifiers used during polymerization, to certain inherent physical properties of these polymers and to the resin and zirconyl-fugitive ligand complex present.

Suitable emulsion polymers can be described structurally as linear and branched chain addition polymers. The structural nature of the polymer is believed to contribute significantly to the unexpected properties of the films of the invention and to the stability properties of the containing compositions. That is, when these polymers are included in the coating compositions of the invention, they have been found to impart unexpected and unobvious stability to the coating compositions and yet produce the unique films of the invention.

For purposes of the present invention, a ligand is defined as an atom, molecule or ion which is able to donate a pair of electrons to an atom, molecule or ion which can accept a pair of electrons. The result is a coordinate covalent bond formed by a pair of electrons shared between two atoms, molecules or ions. In metal coordination compounds, i.e., complexes, a metal ion accepts the pair of electrons from the ligand. Preferred ligands for the polymer component of the film former are substances containing functional groups such as carboxyl ions. In addition to undergoing ligand exchange with the zirconyl-fugitive ligand complex to form ligand-zirconyl bonds, the ligands of the polymer are also capable of undergoing salt formation with various alkaline substances such as ammonium and sodium hydroxide. In a film, these ligands are further characterized as being able to undergo displacement from the zirconyl ions when the film is treated with an alkaline solution containing a complexing agent, i.e., a substance containing a ligand capable of achieving ligand displacement.

For the purposes of the present invention, a polyligand is defined as a substance containing two or more atoms, molecules or ions capable of forming coordinate bonds, i.e., containing two or more functional groups such as two carboxyl ions each of which is capable of furnishing a pair of electrons.

It is essential that a free radical emulsion polymerization process, such as described in "Fundamental Principles of Polymerization" by G. F. D'Alelio, published by J. Wiley & Sons Inc., New York, N.Y. (1952), pp. 201 et seq., be used in preparing the polyligand emulsion polymers used in the coating compositions of the invention. By means of this addition-type polymerization, the ligands of the ligand-containing monomer are included in the polymer in a substantially unreacted state. That is, the carboxyl groups,

groups, of the ligand-containing monomers appear in the polymer as such. The presence of these

groups in the polymer is essential to the invention. In addition, since these polyligand polymers have limited water solubility, it is essential that they form stable dispersions in water in order to comply with the stability requirements of the coating compositions of the invention. The polymeric reaction products obtained from emulsion polymerization are stable aqueous dispersions of polymeric particles.

Anionic emulsifiers are preferred in the free radical emulsion polymerization processes used to prepare the polymers for the coating compositions of the invention. Certain cationic, amphoteric, and nonionic emulsifiers are not preferred since they tend to react with the carboxyl groups of the monomer and/or polymer and/or are neutralized by the alkaline coating compositions of the invention. Moreover, it has been found difficult to polymerize polymers of the invention having suitable particle size (i.e., stability) when using certain nonionic emulsifiers. Mixtures of various emulsifiers are considered useful.

The stable dispersions of emulsified polymer particles can be prepared by emulsifying, at temperatures ranging from about 30° C. to about 100° C. and preferably from about 50° C. to about 80° C., a mixture of the various monomers in water and polymerizing the mixture while it is in the emulsified form. Examples of useful anionic emulsifiers include: sodium lauryl sulfate, sodium salts of alkylaryl polyether sulfonates and sodium salts of alkylnaphthalene sulfonates. Of course, other substances such as the ammonium and potassium salts of these compounds can also be used.

Free radical emulsion polymerization catalysts such as water soluble peroxides, water soluble peroxides in combination with reducing agents (redox systems), or oil soluble peroxides can be employed in preparing the polyligand polymers. Particularly preferred catalysts include the water soluble persulfates such as ammonium persulfate and potassium persulfate.

The concentration of catalyst and emulsifier employed during polymerization has been found to influence the performance of films containing polymers prepared in this manner. The concentration of catalyst can range from about 0.2% to about 3.5%. In a preferred embodiment, the catalyst concentration is from about 0.5% to about 1.5%. In a particularly preferred embodiment, the catalyst is present at about 0.5%. The concentration of emulsifier can range from about 0.5% to about 10%. In a preferred embodiment, the emulsifier concentration is from about 1% to about 5%. In a particularly preferred embodiment, the emulsifier concentration is about 3%. These concentration values are based on the total monomer content.

It has been found that certain polymers useful in the coating compositions of the invention are preferably prepared under free radical emulsion polymerization conditions in the absence of chain-transfer agents. For example, when a polymer comprising methyl methacrylate, 60%; 2-ethylhexyl acrylate, 31%; and methacrylic acid, 9%, was prepared under free radical emulsion polymerization conditions in the presence of 2% of a chain-transfer agent such as lauryl mercaptan and the resultant polymer was included in a coating composition of the invention containing alkali soluble resin and zirconyl complex, the resultant film obtained failed to exhibit the properties of the films of the invention.

The above-described polymers can be prepared by heating the mixture of monomers, catalyst, emulsifier, and reaction solvent below or at the reflux temperature of the solvent.

The polyligand polymers useful in the coating compositions of the invention can be generally described as high molecular weight substances. However, it should be understood that the specific molecular weight of these polyligand polymers is not critical. Although molecular weight determinations can be made on these polymers by means of intrinsic viscosity observations (see the discussion below), it should be understood that molecular weight per se is not controlling. Rather it is essential that these polymers be polyligand in nature, be obtained by means of emulsion polymerization, and form stable dispersions of polymer particles.

The molecular weights of these polymers can be determined by intrinsic viscosity measurements using a viscometer and a method such as described in "Preparative Methods of Polymer Chemistry," W. Sorenson et al., Interscience, New York, N. Y., 1961, pp. 34–42. It was found that polymers such as described above generally have an intrinsic viscosity of at least about 0.43 deciliters/gram at 25° C. which corresponds to a molecular weight of approximately 200,000. Certain preferred polymers useful in the present invention have molecular weights from about 200,000 to about 570,000. It is understood that the intrinsic viscosity of a polymer will vary with polymer structure and with the particular solvent employed when making the intrinsic viscosity determination. An additional discussion of intrinsic viscosity appears in Example 2 infra.

In addition to being stable in the aqueous coating compositions of the invention, the addition-type, emulsion polymers, when combined with resin and zirconyl ions in a chemically resistant film, must be capable of being redispersed upon application to the film of an alkaline solution containing a complexing agent, which effects displacement of the captive polymer ligands from the zirconyl ions. The addition of the complexing agent/alkaline aqueous medium affects the zirconyl bonding between various polymer and resin groups and results in film break-up. Upon break-up of the film it is essential that the polymer constituent be at least partially redispersible in the complexing agent/alkaline aqueous medium in order to achieve optimum removability of the film from the substrate.

The polymer ligands will usually undergo alkaline salt formation after displacement from the zirconyl ions and thereby assist in the formation of dispersible polymer particles. It is known that the emulsifiers associated with the dispersed polymer particles obtained during emulsion polymerization are included with the polymer in the film. Although conceivably some of these emulsifiers may be leached from the film, it is thought that they are present in concentrations sufficient to assist in redispersing the polymer particles during film removal. In addition, the redispersing of these polymer particles is supplemented by the alkali soluble resins present which also function as emulsifiers, and by any detergent contained in the complexing agent/alkaline aqueous medium. Thus, it is evident that only emulsion polymers which readily lend themselves to emulsifying and redispersion are suitable for the coating compositions of the present invention.

For the purposes of the present invention, minimum film forming temperature (MFT) is defined as the minimum temperature at which a polymer emulsion will deposit a continuous film. The apparatus used and the method for the determination of the MFT of the polymer emulsion is described in "Journal of Applied Polymer Science," vol. IV, Issue No. 10, pp. 81–85 (1960). MFT is a means of establishing emulsion polymer hardness, i.e., brittleness, and is controlled by the concentration, proportion, and chemical nature of the component monomers. For example, it has been observed that emulsion polymers having an MFT substantially greater than about 80° C. are too brittle to be useful in the coating compositions of the invention. Therefore, the selection of suitable monomers for the polymers useful in the coating compositions of the invention is determined at least in part by the MFT of the polymer emulsion. The influence of polymer MFT on the coating composition of the invention is discussed in detail infra.

The emulsion polymers of the invention can be further defined as containing: (1) a stabilizing amount of a methacrylate monomer, (2) at least about 5% by weight of a ligand-containing monomer and (3) up to about 60% by weight of a ligand-free monomer which is free from methyl groups on the alpha carbon atom. Unless specifically described otherwise all percentages cited hereinafter are by weight.

METHACRYLATE MONOMER

For the purposes of the present invention, a methacrylate monomer includes monomers and mixtures of monomers having the structural formula:

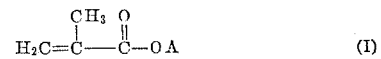

(I)

wherein A is an organo radical containing from one to about ten carbon atoms. In a particularly preferred embodiment, A is a saturated alkyl radical having from one to about ten carbon atoms. The foregoing structural formula shall be referred to hereinafter as Formula I.

It has been found that the methyl group on the alpha carbon atom of the methacrylate monomer unexpectedly influences the stability of the polymer in the coating compositions of the invention. That is, when the methacrylate monomer is replaced by a monomer which is free from a methyl group on the alpha carbon atom, the resulting polymer is generally not sufficiently stable in the coating compositions of the invention. For example, a polymer containing butyl methacrylate (80 percent), ethyl acrylate (11 percent), and methacrylic acid (9 percent) was prepared. This polymer was added to an aqueous coating composition containing a low molecular weight polyligand, alkali soluble resin and a zirconyl-fugitive ligand complex. The difference in optical density of this coating composition after seven days at about 51° C. was about 0.1. Butyl acrylate was substituted for butyl methacrylate in the above-described monomer mixture. The polymer obtained was added to a similar coating composition. This second coating composition was unsatisfactory in that it gelled upon the addition of the butyl acrylate/ ethyl acrylate/methacrylic acid polymer. Other unstable coating compositions were also obtained when polymers which were free from Formula I monomers were substituted for polymers containing a Formula I monomer. For example, when styrene was substituted for methyl methacrylate in a polymer containing methyl methacrylate (49%)/2-ethylhexyl acrylate (45%)/methacrylic acid (6%), when styrene was substituted for methyl methacrylate in a polymer containing methyl methacrylate (71%)/ethyl acrylate (20%)/methacrylic acid (9%), and when styrene was substituted for methyl methacrylate in the polymer containing methyl methacrylate (71%)/ butyl acrylate (20%)/methacrylic acid (9%), each of the coating compositions which contained the styrene containing polymer was unstable and either gelled or had an excessive difference in optical density after seven days at about 51° C.; whereas each of the corresponding coating compositions which contained the methyl methacrylate containing polymer was stable and showed a difference in optical density after seven days at about 51° C. of less than 0.03.

The methacrylate monomer will preferably comprise a major amount by weight of the polymer. As noted above, the amount of methacrylate monomer present will influence the stability of the polymer in the coating composition. For example, when the concentration of methacrylate monomer falls substantially below about 30%, the stability of the resultant polymer dispersion in the coating compositions of the invention is adversely affected, resulting in an increase in viscosity and/or gelation and/ or an increase in the relative optical density after seven days at 51° C. greater than about 0.1. Therefore, a stabilizing amount of methacrylate monomer comprises at least about 30% of the polymer. In a preferred embodiment, up to about 70% methacrylate monomer is used in the polymer; and in a particularly preferred embodiment, from about 55% to about 65% of methacrylate monomer is used. Polymers containing about 60% methacrylate monomer are especially preferred.

Examples of methacrylate monomers, i.e., Formula I monomers, include methyl methacrylate, ethyl methacrylates including hydroxyethyl methacrylate, various propyl methacrylates, various butyl methacrylates including tertiary butyl methacrylate, various pentyl methacrylates, various hexyl methacrylates, various heptyl methacrylates, various octyl methacrylates, including 2-ethylhexyl methacrylate, various nonyl methacrylates and various decyl methacrylates.

LIGAND-CONTAINING MONOMER

The ligand-containing, polymerizable, ethylenically unsaturated monomer provides the necessary functionality to obtain zirconyl bonding with polymer and resin molecules. It is thought that the ligands of the polymer contribute substantially to film performance, including properties such as hardness, gloss and durability and also to the unique chemical resistance and controlled removability characteristics of the film.

Carboxyl groups are particularly preferred ligands. Examples of ligand-containing polymerizable, ethylenically unsaturated monomers wherein the ligand is a carboxyl group include methacrylic and acrylic acid and mixtures thereof. Preferred ligand-containing monomers can be described by the following structural formula:

where $R_1$ can be hydrogen or a methyl radical. This structural formula shall be referred to hereinafter as Formula II. For the purposes of the present invention carboxyl-type ligands are limited to the functional group

and accordingly similar functional groups such as esters, e.g.,

are not considered ligands.

It has been found that the total ligand-containing monomer contents should preferably not exceed about 10% of the polymer. Above this concentration, soap sensitive and/or water sensitive films can be produced and/or the stability of the coating composition can be adversely affected. Therefore, it is essential that the monomers comprising the bulk of the polymer, i.e., the methacrylate monomer and ligand-free monomer, be ligand-free and that the concentration of the Formula II monomer be limited to about 10% of the polymer. The effect of relatively high ligand content polymers on the stability of the coating compositions of the invention and on the film performance of films obtained from these compositions is described in Example 3 infra.

As noted above, the ligand-containing monomer provides the requisite functionality to the polymer necessary to obtain polymer/zirconyl bonding during film formation. That is, the ligand-containing monomer provides the polymer with the functional sites required for the ligand transfer which takes place between the zirconyl-fugitive ligand complex and the polymer which contributes to the formation of a film having captive ligands. It should be noted here that these captive ligands (discussed in detail below) not only impart unique chemical resistance to the film but also play a key role in film removal. Therefore, it can be appreciated that the presence of ligand-containing monomers in the polymers is critical to the coating compositions.

LIGAND-FREE MONOMER

For the purposes of the present invention, a monomer is considered to be ligand-free when it does not contain atoms, molecules or ions normally capable of forming coordinate bonds. In a preferred embodiment of the invention, a ligand-free monomer is defined as a monomer free from any atom, molecule or ion capable of forming a coordinate bond such as a carboxyl ion. Suitable ligand-free monomers must be capable of undergoing addition-type emulsion polymerization with the other monomers of the polymer. Therefore, the ligand-free monomer is an ethylenically unsaturated monomer and includes monomers such as styrene, vinyl toluene and acrylate monomers including 2-ethyl-hexyl acrylate end ethyl acrylate.

For the purposes of the present invention, a ligand-free, polymerizable, ethylenically unsaturated monomer which is free from methyl groups on the alpha carbon atom includes monomers and mixtures of monomers having the following structural formula:

$$CH_2=CH-X \quad \quad (III)$$

wherein X is a functional group such as

wherein A is as defined in Formula I above; or X is an aryl or alkylaryl group. In a preferred embodiment examples of these monomers include: vinyl toluene, vinyl acetate, styrene and acrylates such as ethyl, propyl, butyl and 2-ethylhexyl acrylate. The foregoing structural formula shall be referred to as Formula III.

For the purposes of the present invention, the alpha carbon atom is defined as the carbon atom alpha to the functional group, i.e., the

group in Formula I and the —X group in Formula III.

In one embodiment of the invention, the ligand-free, polymerizable, ethylenically unsaturated monomer which is free from methyl groups on the alpha carbon atom includes acrylates such as methyl acrylate, hydroxyethyl acrylate, various propyl acrylates, various butyl acrylates including tertiary butyl acrylate, various pentyl acrylates including n-pentyl acrylate, various hexyl acrylates, various heptyl acrylates, various octyl acrylates including 2-ethylhexyl acrylate, 3-ethylhexyl acrylate, 3,4-dimethylhexyl acrylate, 2-ethylheptyl acrylate, 3-ethylheptyl acrylate, 4-ethylheptyl acrylate, 3-methylheptyl acrylate, 4-methylheptyl acrylate, 5-methylheptyl acrylate, 6-methylheptyl acrylate, 2,3-dimethylheptyl acrylate, n-octyl acrylate, various nonyl acrylates, various decyl acrylates including 3-ethyloctyl acrylate, 5-ethyloctyl acrylate, 2,3-dimethyloctyl acrylate, 3-ethyloctyl acrylate, 6-ethyloctyl acrylate; isopropyl acrylate and isobutyl acrylate.

It is essential to the present invention that the Formula III monomer be present in the polymer at a concentration no greater than about 60%. It has been observed that polymers containing Formula III monomers at concentrations greater than about 60% tend to produce unstable coating compositions. See Example 3 infra.

It has been found that the polymer must contain some Formula III monomer in order to provide a coating composition which produces an acceptable film. For example, when a polymer containing methyl methacrylate, 91% and methacrylic acid, 9%, is added to the coating compositions of the invention, a discontinuous crazed film is obtained. However, when about 31% of 2-ethylhexyl acrylate is added to a monomer mixture containing methyl methacrylate, 60%, and methacrylic acid, 9%, and the resulting polymer is added to a similar coating composition, a continuous film, free from crazing, is obtained.

The weight ratio of the Formula III monomer to the Formula II monomer in the polymer can range from about 2:1 to about 12:1 and preferably from about 2:1 to about 4:1. For example, in a polymer containing methyl methacrylate, 2-ethylhexyl acrylate and acrylic acid, the weight ratio of 2-ethylhexyl acrylate to acrylic acid is preferably about 3:1. The weight ratio of the methacrylate monomer of Formula I to the mixture of Formula II and Formula III monomers can range from about 1:2.3 to about 4:1 and preferably from about 1:1 to about 2.4:1. For example, in the above-described polymer, the ratio of methyl methacrylate to a mixture of 2-ethylhexyl acrylate/acrylic acid is preferably about 1.5:1.

Suitable polyligand, emulsion polymers include terpolymers such as methyl methacrylate/2-ethylhexyl acrylate/acrylic acid, methyl methacrylate/2-ethylhexyl acrylate/methacrylic acid, methyl methacrylate/butyl acrylate/methacrylate acid, methyl methacrylate/butyl acrylate/acrylic acid, ethyl methacrylate/2-ethylhexyl acrylate/acrylic acid, ethyl methacrylate/2-ethylhexyl acrylate/methacrylic acid, ethyl methacrylate/butyl acrylate/methacrylic acid and ethyl methacrylate/butyl acrylate/acrylic acid. It should be understood that the polyligand emulsion polymers described above can contain various mixtures of each of the component monomers.

For example, a mixture of suitable Formula I monomers can be polymerized with mixtures of Formula II monomers and mixtures of Formula III monomers provided the various monomers are present in the proportions discussed above.

When the coating compositions of the invention are to be used as floor coatings, the type of polymer employed in the composition is more critical than when these compositions are used in other coating applications. That is, floor coating compositions should preferably form hard, continuous durable films in a relatively short period after application to the substrate. It has been found that the particular Formula I and Formula III monomers employed and the ratio of these monomers in the above-described polymers are critical when coating compositions containing these polymers are used as a floor coating. That is, various Formula I and Formula III monomers in certain ratios have been found to produce polymers which form soft coatings at ambient temperature and are undesirable for application to floors. It is thought that certain of the Formula I and Formula III monomers function as internal plasticizers in the polymer. It has been established that the hardness (suitability for use in floor coatings) of certain polymers can be controlled by the type of Formula I and Formula III monomer used and the concentration of each in the polymer. For example, a polymer containing methyl methacrylate, 60%; 2-ethylhexyl acrylate, 31%; and methacrylic acid, 9%; is hard and is a preferred polymer for use in floor coating compositions. However, a polymer containing methyl methacrylate, 31%; 2-ethylhexyl acrylate, 60%; and methacrylic acid, 9%; is soft and is not desirable as the sole polymer in floor coating compositions. A polymer containing butyl methacrylate, 40%; ethyl acrylate, 51%; and methacrylic acid, 9%; is relatively soft and not preferred for use in floor coating compositions. In addition, the coating composition made with this polymer is unstable. When the concentration of the Formula I and III monomer was changed to 80% and 11% respectively and the resultant polymer was added to a coating composition, it formed a hard film.

The effect on polymer hardness produced by increase in the chain length of the ester alkyl group of certain acrylate and methacrylate esters of Formula I and III monomers can be illustrated by observing the brittle points of various n-alkyl acrylate and methacrylate homopolymers. See for example "Industrial and Engineering Chemistry," vol. 40, p. 1429 et seq. (1948).

As noted above, the selection of Formulas I and III monomers and the concentration of these monomers determines the MFT of the resulting polymer. It has been observed that if a polymer has an MFT above about 80° C., it will not be suitable for the coating compositions of the present invention since it produces a crazed and/or discontinuous film. For example, a polymer containing methyl methacrylate, 80%; vinyl acetate 11%; and methacrylic acid, 9%; had an MFT of about 100° C. When this polymer was added to a coating composition of the invention containing a resin cut and a zirconyl-fugitive ligand complex, it formed a crazed film. It should be noted that the stability of this polymer in the coating composition of the invention was acceptable. In contrast to the foregoing, when the concentration of the vinyl acetate in the above described polymer was increased to about 31% and the concentration of the methyl methacrylate was reduced to about 60%, a polymer having an MFT of about 74° C. was obtained. This polymer was stable in the coating compositions of the invention and produced an acceptable film.

Examples of other polymers which were found to have unsatisfactory MFT's and produced unsatisfactory films are set forth in Table I.

Examples of polymers which have MFT's below about 80° C. and which produced acceptable films are listed in Table II.

TABLE I

| Formula I Monomer | Percent by Weight | Formula II Monomer | Percent by Weight | Formula III Monomer | Percent by Weight | Polymer MFT, ° C. |
|---|---|---|---|---|---|---|
| Ethyl methacrylate | 80 | Methacrylic acid | 9 | Styrene | 11 | 90 |
| Do | 71 | do | 9 | Vinyl toluene | 20 | 100 |
| Methyl methacrylate | 71 | do | 9 | Ethyl acrylate | 20 | 81 |
| Do | 71 | do | 9 | Butyl acrylate | 20 | 80 |
| Do | 71 | do | 9 | 2-ethylhexyl acrylate | 20 | 82 |
| Do | 80 | do | 9 | Vinyl acetate | 11 | 100 |

TABLE II

| Formula I Monomer | Percent by Weight | Formula II Monomer | Percent by Weight | Formula III Monomer | Percent by Weight | Polymer MFT, ° C. |
|---|---|---|---|---|---|---|
| Butyl methacrylate | 80 | Methacrylic acid | 9 | Styrene | 11 | 59 |
| Methyl methacrylate | 60 | do | 9 | 2-ethylhexyl acrylate | 31 | 55 |
| Do | 51 | do | 9 | do | 40 | <80 |
| Do | 31 | do | 9 | do | 60 | <0 |
| Do | 47 | do | 6 | do | 47 | 10 |
| Do | 60 | do | 9 | Vinyl acetate | 31 | 74 |

The effect of Formula I and Formula III monomers on MFT is apparent from the data set forth in Tables I and II above.

It has been found that the MFT of the coating composition should preferably be below about ambient temperature, i.e., about 25° C. to avoid the formation of crazed films.

It is understood that certain polymers having marginal MFT's can be plasticized sufficiently with plasticizers such as tris (butoxyethyl) phosphate to form films which have limited use in certain coating compositions. It has been found that most polymers having an MFT greater than about 20° C. can be plasticized to improve their film forming properties. In addition to conventional plasticizers, these polymers can also be plasticized with a soft polymer such as a soft terpolymer containing methyl methacrylate, 31%; 2-ethylhexyl acrylate, 60%; methacrylic acid, 9%; to produce an acceptable film. When more than one polymer is used in the coating compositions of the invention, the MFT of the polymer blend must be less than about 80° C. Accordingly, blends of polymers, wherein one of the polymers has an MFT greater than 80° C., can be successfully used in the coating compositions of the invention, provided that the MFT of the blend is less than about 80° C. Of course, these blends of polymers must be stable in the coating compositions of the invention.

RESIN

The low molecular weight, polyligand, alkali soluble resins used in the coating compositions of the invention provide a substantial amount of the ligand functionality to these compositions.

These resins have been found to contribute substantially to the stability of the coating compositions of the invention and to the controlled removability properties of the films of this invention.

For the purposes of the present invention, a resin is considered alkali soluble when it contains no less than about 0.0025 equivalents of carboxyl groups per gram of resin and is capable of being substantially completely solubilized when a minimum of from about 80 to about 90% of these carboxyl groups are neutralized by an aqueous basic solution of substances such as borax, amines, ammonium hydroxide, sodium hydroxide, and/or potassium hydroxide. For example, a suitable styrene/acrylic acid resin having an acid number of about 190 would contain no less than about 0.0034 equivalents of carboxyl groups per gram of resin and would be substantially completely solubilized when a minimum of from about 80 to 90% of the carboxyl groups are neutralized by an aqueous base solution.

Resins suitable for use with the compositions of this invention can be described as:

Alkali soluble substances having:

(a) an acid number from about 140 to about 300 and
(b) a number average molecular weight up to about 5,000.

The acid number of the resins used in the present invention are the actual or observed values as distinguished from theoretical values and can be obtained by dissolving the resin in a solution containing 66% by weight ethanol and 34% by weight benzene and titrating the resin/solvent mixture to the phenophthalein end point with a 0.1 N aqueous NaOH solution. This general procedure is described by S. H. Pinner in "Practical Course in Polymer Chemistry" (1961), Pergamon Press, New York N.Y., at p. 113.

It has been observed that the acid number of certain methacrylic acid-containing resins of the invention can be more readily obtaining by dissolving the resin in acetone and titrating the resin/acetone mixture beyond the phenophthalein end point with a 0.1 N aqueous NaOH solution. The tritrated resin/aceton mixture is then allowed to stand for about an hour at room temperature and is then titrated to the phenophthalein end point with a 0.1 N HCl solution. A solvent blank should be run under the same conditions as the acid number determination and the observed acid number for the resin corrected for the solvent effect. It has been observed that better reproducibility is obtained if titrations are carried out at room temperature. It is understood that for the purposes of the present invention the term acid value can be used interchangeably with the term acid number.

The acid number of the low molecular weight resins has been found to influence directly the solubility of these resins in the aqueous alkaline coating compositions and the chemical resistance and controlled removability properties of films produced from these compositions. For example, at an acid number substantially below about 140, i.e., about 110, certain of the resins are relatively insoluble in the aqueous coating compositions of the invention. When the acid number is substantially above about 300, the resin fails to provide a chemically resistant film having controlled removability. It is suggested that when such high acid value resins are employed, it is difficult to obtain sufficient zirconyl bonding during film formation, accordingly, the free carboxyl content is such that the resultant film is subject to attack by water and detergents. The acid value of suitable resins can range from about 140 to about 300. In a preferred embodiment, the acid value will range from about 190 to about 230. In a particularly preferred embodiment, the acid value will be at least about 200. In the styrene/acrylic acid resin, the mole ratio of styrene to acrylic acid can also be used to define the acid value.

As noted above, the number average molecular weight of these resins can range up to about 5,000. In a preferred embodiment, the number average molecular weight is from about 600 to about 5,000. In a particularly preferred embodiment, the number average molecular weight is from about 600 to about 4,000. It is understood that all molecular weight values given for the resin throughout the specification and claims are number average molecular weights which can be determined by using a Vapor Pressure Osmometer model 301A, using a nonionized solvent such as methyl ethyl ketone. Accordingly, the term molecular weight as used hereinafter is intended to define number average molecular weight.

The molecular weight of the alkali soluble resins of the invention is critical in that outside the number average molecular weight range of up to about 5,000 certain resin cuts of the invention will not perform satisfactorily in the coating compositions of the invention.

A suitable molecular weight of a specific alkali soluble resin is in part dictated by its chemical composition. For example, suitable condensation polymerization resins can be used in the coating compositions of the invention. These include certain polynuclear resins such as rosin/maleic anhydride adducts which are condensed with polyols. These condensation resins are commercially available as Durez 19788 and 15546, have number average molecular weights of about 720 and 1,000 and acid numbers of about 200 and 140 respectively. Other commercially available condensation polymerization resins suitable for use in the coating compositions of the invention include rosin/maleic anhydride adducts which are condensed with polyols such as:

(a) Shanco L-1165 which has a molecular weight of about 600 and an acid number of about 190, Shanco L-1165S which has a molecular weight of about 600 and an acid number of about 190, Shanco 60-61 which has a molecular weight of about 650 and an acid number of about 210, Shanco L-1177 which has an acid number of about 200, and Shanco 60-72 which has a molecular weight of about 720 and an acid number of about 200.
(b) Schenectady SR-88 which has a molecular weight of about 780 and an acid number of about 190 and Schenectady SR-91 which has an acid number of about 185.

(Note: where molecular weight of resins described in (a) through (e) is not stated it is below about 5,000.)

(c) Alresat 618 has an acid number of about 180.
(d) Nelio VBR-7055 which has an acid number of about 200.

In contrast, certain addition-type polymerization resins comprised of certain Formula III and Formula II monomers such as styrene/acrylic acid resins having a number average molecular weight up to about 5,000 are useful. Similar lower molecular weight styrene/acrylic acid resins having a number average molecular weight of less than about 2,000 are not preferred for use with the coating compositions of the invention. Certain of these lower molecular weight styrene/acrylic acid resins are found to adversely affect the stability of the aqueous coating compositions of the invention. Accordingly, styrene/acrylic acid resins having a number average molecular weight from about 2,000 to about 4,000 are preferred. In a preferred embodiment, the number average molecular weight of these addition-type resins can range from about 3,000 to about 3,500. When the resin is a condensation-type resin such as an esterified rosin/maleic anhydride reaction product, the number average molecular weight can range from about 600 to about 1,000. In a preferred embodiment, the number average molecular weight of condensation resins is about 700.

The addition-type resins such as the styrene/acrylic acid resins can contain up to about 25 mole percent of a modifying monomer such as: N-vinylpyrrolidone, diethylaminoethyl methacrylate, 2-methyl-5-vinylpyridine, acrylonitrile, methyl acrylate, butyl acrylate, 2-ethylhexyl acrylate, methyl methacrylate, and butyl methacrylate.

Examples of other suitable resins include: styrene/acrylic acid having a number average molecular weight of about 3,000 and an acid number of about 200, styrene/acrylic acid having a number average molecular weight of about 2,500 and an acid number of about 180, styrene/acrylic acid having a number average molecular weight of about 4,000 and an acid number of about 160, styrene/acrylic acid having a number average molecular weight of about 3,700 and an acid number of about 240.

Similar to the polymers discussed above, the method of preparing certain of the low molecular weight resins of the invention is critical. Suitable low molecular weight resins, by definition, are polyligand in nature. The preferred ligand is a carboxyl group. In order to obtain polyligand resins, it is generally desirable to employ solution addition-type polymerization with polymerizable ethylenically unsaturated monomers, at least one of which contains a carboxyl group. With the exception of certain condensation resins such as the modified rosin ester discussed above, it has been found that most resins obtained from condensation polymerization, which are characterized by relatively large concentrations of ester groups, or anhydride or ether linkages, fail to provide films having the required chemical resistance. Moreover, it has also been found that certain resins obtained by means of addition polymerization are not suitable if they contain relatively large concentrations of pendant ester groups. It is suggested that even though certain of the condensation resins discussed above have ester groups, the hydrophilic effect of these ester groups can be tolerated because of the more hydrophobic polynuclear backbone of the resin. Thus, these particular condensation resins are satisfactory.

The various styrene/acrylic-type alkali soluble resins are preferably obtained by means of solution polymerization.

For the purposes of the present invention, a resin cut is defined as an alkaline aqueous solution obtained by solubilizing a low molecular weight polyligand resin with an aqueous base such as ammonium hydroxide. The alkali soluble resins are used in the coating compositions of the invention as a resin cut.

The resin cut referred to above can be further described as comprising a substantially clear solution containing a low molecular weight, polyligand, alkali soluble resin and an aqueous base, at least a major amount of the moles of base is comprised of an alkaline substance having a fugitive cation. The resin cut:

(a) has a pH greater than about seven,
(b) is able to depress the surface tension of water by at least about 20 dynes/cm. at 25° C. at a concentration of about 20% by weight solids,
(c) is a leveling agent.

The stoichiometric amount of base such as NH$_4$OH required to neutralize all of the resin carboxyl groups will result in a resin cut having a pH of about eight. Thus in an ammonia cut resin of the invention having a pH greater than about eight, the carboxyl groups of the resin will be essentially 100% neutralized.

The effect these resins have on the surface tension of water is an indication of their usefulness as surfactants. That is, at concentrations of about 20% by weight solids, these resin cuts have been observed to depress the surface tension of water by at least about 20 dynes/cm. at 25° C. In such resin cuts the particularly preferred resins of the invention have been observed to reduce the surface tension of water from about 25 to 30 dynes/cm. at 25° C. Thus, it is apparent that these substances are effective polysurfactants in various aqueous base compositions.

The leveling properties of these substances can be observed when they are added to the coating compositions of the invention which are subsequently applied to a substrate. Under these conditions the resins are found to assist in the formation of uniform, continuous films which are usually characterized by high gloss. Therefore, for the purposes of the present invention a leveling agent is a resin cut which when added to a coating composition will:

(1) effect an even flow-out of the coating composition upon application to a substrate and
(2) form a part of the resulting film upon drying of the coating composition and thereby influence the formation of a smooth, continuous film, substantially free from application marks.

As noted above at least a major amount of the moles of base in the resin cut is comprised of an alkaline substance having a fugitive cation, i.e., $NH_4^+$ which converts to volatile $NH_3$. The resin is present preferably as the soluble ammonium salt. It has been found that in order to obtain a chemically resistant film, a major amount of the alkaline component of the alkali soluble resin cut must contain a fugitive cation in order to obtain ligand transfer with the zirconyl-fugitive ligand complex during film formation. However, it has been found that neutralization of up to about 40% of the resin carboxyl groups with a non-fugitive alkaline substance, e.g., sodium hydroxide, can be tolerated before zirconyl-ligand bonding and film resistance is adversely affected. These resins are also relatively soluble in other aqueous alkaline media. For example, in addition to being soluble in the alkaline liquid coating compositions of the invention, these alkali soluble resins are soluble in the aqueous alkaline complexing mixtures used to remove the film from a substrate.

It has been found that the alkali soluble resins of the invention (in the form of a resin cut) are stable in the aqueous coating compositions. It is thought that at least some of the carboxyl groups of the resin tend to form bonds with the zirconyl ions. It is known that extensive inter- and intramolecular bonding of the resin ligands in an aqueous medium results in increases in viscosity and unstable mixtures. However, with the alkali soluble resins of the invention, apparently there is a balance between zirconyl-resin bonding and ammonium salt formation, so that when these resins are present in the alkaline aqueous coating compositions of the invention containing zirconyl-fugitive ligand complex, they remain stable.

COMPLEXING AGENT

In addition to the organic film former discussed above, the liquid coating compositions of the invention contain a substance which can be described as a zirconyl-fugitive ligand complex, which is capable of undergoing ligand exchange with at least some of the carobxyl groups of the organic film former.

A suitable zirconyl-fugitive ligand complex such as ammonium zirconyl carbonate, ideally represented as $$(NH_4)_3ZrOH(CO_3)_3$$

must be capable of promoting ligand transfer with ligands of the organic film former and has three essential components incuding:

(a) the zirconyl ion, which represents the bridging group that is capable of undergoing ligand transfer,
(b) a fugitive ligand, such as a carbonate ion, which readily converts under certain conditions to a volatile gas such as carbon dioxide;
(c) a fugitive cation such as an ammonium ion which is capable of converting to a volatile gas such as ammonia.

For the purposes of the present invention certain substances including ligands and/or cations are considered fugitive if at least a portion thereof tends to volatilize under normal film forming conditions and tends to escape from the coating composition during the formation of the films of the invention.

The zirconyl ion in its bridging form is ideally represented as $Zr=O^{++}$. However, it is thought that the structure is more complicated than $Zr=O^{++}$. That is, the carbonate ions present can be described as forming chelates, bridging groups or singly bonded bicarbonates with the condensed zirconyl ions. For example, in alkaline solution in the presence of carbonate ions, the zirconyl ion can be represented structurally as a polymeric species having the following monomer unit:

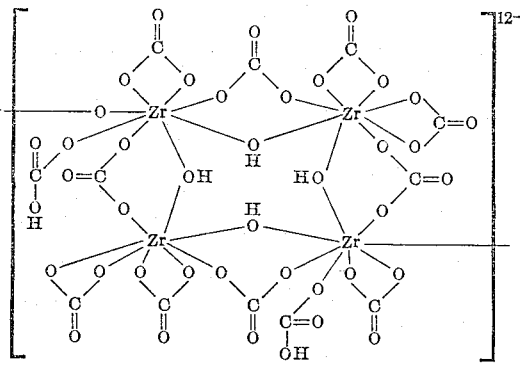

Since the carbonate and bicarbonate ions readily decompose to a fugitive substance, $CO_2$ gas, it is thought that the various zirconyl condensation products present in the alkaline aqueous coating compositions of the invention will undergo ligand transfer, i.e., exchange, with carboxyl groups of the polymer and resin during film formation. That is, fugitive substances such as $CO_2$ gas will escape from the coated surface during film formation. Of course, as noted above, some of this ligand transfer occurs to a limited degree in the liquid coating compositions of the invention prior to film formation. However, since these coating compositions are preferably stored in a substantially airtight package, the concentration of fugitive substances in the head space of the package reaches an equilibrium which in turn limits the amount of zirconyl condensation product available for ligand transfer during storage.

During film formation it has been observed that if the ligands of the zirconyl complex are not fugitive, they tend to compete with the ligands of the organic film former in the formation of zirconyl ligand bonds, thereby reducing organic film former/zirconyl bonding.

In addition to being fugitive, the ligand of the zirconyl ligand complex must be capable of being displaced by the ligands of the film former, i.e., displacement of the carbonate ion from the zirconyl-fugitive ligand by the carboxyl groups of the organic film former. Therefore, in addition to the fugitive nature of the ligands of the zirconyl-fugitive ligand complex, ligand transfer is dependent, in part, upon the stability of the zirconyl-fugitive ligand complex. That is, a zirconyl ligand complex which is too stable in the coating composition would not be desirable since suitable ligand transfer would not be readily obtained during film formation. Examples of zirconyl ligand complexes which are too stable in the coating composition and therefore do not promote suitable ligand transfer during film formation include substances such as ammonium zirconyl glycolate and ammonium zirconyl lactate.

Unexpectedly, it has been found that the cation of the zirconyl-fugitive ligand complex must also be fugitive. For example, if the cation is a metallic ion such as sodium or potassuim, optimum zirconyl bonding with the organic film former is not obtained and the resultant films do not have the structural integrity required of the films of the invention. For example, they do not have sufficient chemical resistance. It is thought that during film formation such non-fugitive metallic cations compete with the zirconyl ions in forming bonds with the organic film formed ligands. When the cation is $NH_4^+$, the equilibrium between: (a) zirconyl-film former-ligand and (b) $NH_4^+$ film former-ligand, bonding is shifted in favor of the former since $NH_4^+$ readily forms a fugitive gas, $NH_3$, which volatilizes during film formation and escapes from the coating composition. Moreover, when the cation of the complex is sodium i.e., the complex $Na_3ZrOH(CO_3)_3$, in a concentration sufficient to provide a $ZrO^{++}:CO_2^-$ of about 0.30, there are sufficient sodium ions present to neutralize about 90% of the total organic film former ligands present. Such a composition would produce a water sensitive film which is outside the scope of the present invention.

In view of the foregoing, it is apparent that the term zirconyl-fugitive ligand complex describes a composition wherein the cation as well as the ligand are fugitive.

It is thought that significant salt formation and zirconyl bonding occurs between the organic film former ligands and the zirconyl-fugitive ligand complexing agent in the liquid aqueous coating compositions. Since suitable resins of the organic film former are relatively low molecular weight substances with substantial carboxyl functionality, it is thought that substantial zirconyl bonding can be tolerated before insoluble resins are obtained in the coating composition. The formation of ammonium carboxylate salts with the fugitive cations of the zirconyl complex have a solubilizing effect on the alkali soluble resins and thus compensates somewhat for the bonding obtained between resin carboxyl groups and zirconyl ions.

The presence of the methacrylate monomer (Formula I) is thought to have a stabilizing effect on polymer stability under these zirconyl bonding conditions. In addition, the emulsion polymerization emulsifiers associated with the polymer particles are thought to contribute substantially to the stability of the polymer under the salt forming and zirconyl bonding conditions encountered during storage of the coating composition. Therefore, the particular polymer and resin components of the aqueous coating composition effectively maintain the composition in a stable condition, i.e., free from substantial zirconyl bonding, and the bonding necessary for forming the films of the invention occurs only upon release of the various fugitive components of the coating composition.

It has been found that a change in the pH of the coating compositions of the invention adversely affects the stability of the zirconyl-fugitive ligand complex per se and/or the stability of the entire liquid coating composition. For example, at a pH below about 7.0, the ammonium zirconyl carbonate complex is unstable and the coating compositions of the invention will gel. At a pH above about 9.0, extensive zirconyl bonding is obtained between ammonium zirconyl carbonate and the polyligand film former resulting in increases in viscosity and increases in film former particle size with loss of stability. For example, at a pH substantially above 9.0, i.e., about 9.2, coating compositions of the invention have had differences in optical density of greater than 0.1 after 7 days at 51° C.

Although the organic film former components, i.e., the polymer and resin and certain zirconyl-fugitive ligand complexes would probably be dispersible and/or soluble in various organic solvents, it is apparent that the degree of ionization obtained in aqueous media cannot readily be achieved with most organic solvents, including highly polar substances. It is particularly important that the zirconyl-fugitive ligand complex does not precipitate from the liquid coating composition. The particular zirconyl-fugitive ligand complexes suitable for the coating compositions of the invention are soluble in aqueous media and, accordingly, ionize to the respective cation and zirconyl ion-fugitive ligand components. It has been found that less soluble, more stable metal-containing complexes, which do not readily ionize in aqueous media, do not permit the extensive ligand transfer required during film formation. For example, various metals do not form soluble complexes in the coating compositions of the invention. Calcium, for example, does not form ammonium calcium carbonate in the alkaline aqueous medium but rather forms a relatively insoluble salt, calcium carbonate. Moreover, with the exception of certain rare earth metals and substances such as uranium, hafnium, and the like, there are no metals available commercially which will form stable metal-containing complexes comprising a fugitive cation and a fugitive ligand. For example, other alkaline earth complexes such as the ammonium salt of the calcium (ethylenedinitrilo) tetraacetic acid complex contains a fugitive cation but the (ethylenedinitrilo) tetraacetic acid ligand is not fugitive.

When the coating compositions of the invention are in the form of films, the zirconyl ions of the complexing agent are responsible for maintaining a substantial amount of the organic film former ligands in a captive state, i.e., as captive ligands. The concept of captive ligands is discussed infra.

During the film forming process, i.e., when the coating composition is applied to a substrate and the fugitive cation of the resin cut and the fugitive cation and the fugitive ligand of the zirconyl-fugitive ligand complex volatilize, the zirconyl ions are able to form bonds with the ligands of the organic film former. That is, as the fugitive cation and fugitive ligand of the zirconyl-fugitive ligand complex escape, the zirconyl ions undergo ligand transfer with the organic film former ligands. Thus, the zirconyl ions transfer from the escaping fugitive ligand to the available ligands of the resin and/or polymer in the coating compositions. This zirconyl-film former ligand bonding results in a film having a substantial amount of the ligand content tied up in the form of zirconyl-ligand bonds. In this condition, these ligands are defined as captive for the purposes of the invention.

The zirconyl-fugitive ligand complex will comprise from about 0.30 to about 1.50% by weight of the coating composition. In a preferred embodiment of the invention, the zirconyl-fugitive ligand complex will comprise from about 0.6 to about 1.2% by weight of the coating composition. In a particularly preferred embodiment of the invention, the complex will comprise about 0.9% by weight of the composition. The percent by weight of ammonium zirconyl carbonate is based on the solid crystalline complex of this substance.

In addition to the organic film former and zirconyl-fugitive ligand complex, the coating compositions of the invention can contain additional substances which will contribute to various properties of the film. For example, various waxes such as polyethylene wax can be included in the coating compositions of the invention. It has been observed that unless the particle size of the polyethylene wax is controlled, the stability of the coating composition is adversely affected.

When certain hard polymers are used in the coating compositions of the invention, it has been found desirable to employ minor amounts of leveling aids, plasticizers, emulsifiers, and other film supplements, including fatty acid soaps, i.e., tall oil fatty acid diethylaminoethanol soap, tris(butoxyethyl)phosphate, ethylene glycol, propylene glycol and mixtures thereof, nonionic emulsifiers such as an octylphenyl polyethoxyethanol containing from 30 to 40 moles of ethylene oxide per mole of emulsifier.

FILM

The films of this invention contain captive ligands and have the unique properties of structural integrity and controlled removability. These films are comprised of:
(a) polyligand emulsion polymers having MFT's of less than about 80° C.,
(b) low molecular weight, polyligand, alkali soluble resins having acid numbers from about 140 to about 250, and
(c) zirconyl ions, wherein the ratio of moles of zirconyl ions to total ligand equivalents is from about 0.1 to about 0.5.

The metal-containing films of the invention have a unique property described herein as structural integrity which is evidenced by:

(a) unexpected and unobvious chemical resistance, see Examples 10, 11, and 12, and
(b) unexpected and unobvious resistance to indentation and to foot traffic attrition, see Examples 8 and 9 respectively.

It is thought that during film formation, the zirconyl ions function as crosslinking agents and combine with ligands of the organic film former to form a crosslinked network. It is also thought that this zirconyl-ligand bonding, i.e., the formation of captive ligands, provides the films of the invention with an integral barrier to the penetration of certain solvents such as water, detergent solutions, foodstuffs, and various organic substances. This crosslinked network is also thought to provide the unexpected durability and resistance to indentation.

In addition to the property of structural integrity described above, these films have the unexpected and unobvious property of controlled removability. That is, these films are chemical sensitive in that the captive ligands of the film will undergo ligand displacement when treated with certain complexing agents contained in an alkaline medium. This ligand displacement results in film break-up. Subsequent removal of the film from a substrate can be readily achieved. Film removal is discussed below.

In the coating composition of the invention, the ratio of zirconyl ions to ligand equivalents (moles of zirconyl-fugitive ligand complex/equivalents of carboxyl groups) is an indication of the bonding efficiency of the zirconyl ions when they form the films of the invention. This ratio is from about 0.1 to about 0.5 and preferably from about 0.15 to about 0.3. In a preferred embodiment, this ratio will be about 0.15. This ratio, of course, is a measure of the ligand-zirconyl bonding obtained during film formation and also suggests the concentration of complexing agent required to remove the film.

When the coating compositions of the present invention are used as floor coatings, they have been found to produce films having unexpected and unobvious improvements in gloss, hardness, and durability. That is, if several applications of a coating composition of the invention are applied to a substrate, a significant improvement in gloss is observed as compared to similar applications of a conventional floor coating composition in a side by side test. See Example 7 infra. Under the same test conditions, the films of the invention showed substantial improvement in film hardness and durability when observed under routine household traffic conditions. (See Example 7.)

It is understood that these coating compositions can be applied to numerous substrates by various methods including application with a rag, mop, brush, and by spraying and/or dipping. The films of this invention have been obtained on a broad class of substrates ranging from metals and glass to wood and various synthetic substances. For example, the coating compositions of the invention have been applied as temporary protective coatings to metals such as chrome and steel, to various natural and synthetic surfaces including wood, linoleum, and vinyl asbestos, asphalt, vinyl tile, and leather. Further, these compositions have been used in permanent coatings such as paints which have the unique advantage of controlled removability. Additionally, these coating compositions could be used as shellac and varnish-like coatings and/or adhesives.

FILM REMOVAL

The method of removing the captive ligand-containing films of the invention comprises applying an aqueous mixture containing an alkaline complexing agent to the film. The alkaline complexing agent achieves displacement of the captive ligands and effects salt formation with at least some of the available organic film former ligands. It has been found that effective film removal is readily obtained with uni- and multi-layer films of the invention by the application of such alkaline complexing agents. Moreover, it has been observed that film removal can also be obtained with multi-layer films wherein at least some of the layers are comprised of the coating compositions of the invention and the remainder are comprised of conventional coating compositions.

Suitable complexing agents contain a ligand capable of achieving ligand displacement and include substances such as sodium hydroxide, potassium hydroxide, ammonium hydroxide, sodium carbonate, ammonium carbonate, sodium phosphate, ammonium phosphate, and the like. The complexing agent, therefore, effects displacement of the captive ligand and provides a new ligand-zirconyl group while the displaced film former ligands are substantially free from zirconyl bonding. Such captive ligand displacement is an equilibrium phenomenon and is influenced by parameters such as concentrations of the various constituents. Accordingly, an excess of the complexing agent and/or precipitation or solubilization of the resultant, newly formed zirconyl-ligand complex and/or removal of the film former ligands will shift the equilibrium in favor of film former ligand displacement and result in film break-up. Usually an excess of the alkaline complexing agent is used. This excess alkaline complexing agent provides a two-fold result. First, ligand displacement is shifted in favor of the newly formed ligand-zirconyl complex. Secondly, the available film former ligands are converted to alkali salts which assist in film removal.

In order to obtain the controlled removability properties of the film, it is essential that the film former be a polyligand substance. It is further necessary after captive ligand displacement that the polymer be dispersible in the alkaline complexing solution. This property is necessary in order to effectively remove the film from the substrate. That is, if a polymer is used which is not dispersible, a film containing the polymer is difficult to remove from a substrate since islands of such polymer tend to remain on the substrate.

Of course, the alkali soluble, low molecular weight polyligand resins of the film former provide a substantial amount of the ligands required for zirconyl-ligand bonding. When an alkaline solution of complexing agent is applied to the film, ligand displacement and alkali-ligand salts are obtained. This salt formation, of course, influences the solubility of the resin in the alkaline complexing solution and assists in removing the film from the substrate.

Having described the invention in general terms, the following examples will more particularly illustrate certain embodiments of the invention. Proportions are parts by weight unless expressly indicated otherwise.

Example 1

A high molecular weight polyligand emulsion polymer containing methyl methacrylate, 47.5%, 2-ethylhexyl acrylate, 47.5%, and acrylic acid, 5% was prepared as follows: 95 parts methyl methacrylate, 95 parts 2-ethylhexyl acrylate, and 10 parts acrylic acid were admixed in a suitable vessel. 358 parts deionized water, 20.7 was 35:65. The ratio of zirconylions to total polymer and resin carboxyl equivalents was 0.30 for Formulations I and III and 0.15 for Formulation II. The total nonvolatile concentration in each formulation was about 15% and the pH of each formulation was about 7.7.

Similar coating compositions were tested wherein styrene/acrylic acid resins such as described above were substituted for the esterified rosin/maleic anhydride resin. Similar results were obtained with these coating compositions of the invention.

TABLE III

| Polymer | Stability (change in optical density) Formulation | | | Single Coat Resistance Formulation | | | Multiple Coat Removal Formulation I | Film appearance on drying at ambient conditions |
| --- | --- | --- | --- | --- | --- | --- | --- | --- |
| | I/days | II/days | III/days | I | II | III | | |
| 71MMA/20BuA/9MAA | .050/7 | .001/7 | .012/7 | 9.3 | 9.0 | 9.0 | 2.0 | Crazed. |
| 66MMA/25BuA/9MAA | .020/15 | | .018/15 | 10.0 | | 10.0 | | |
| 41MMA/50BuA/9MAA | .036/15 | | | 5.0 | | | | |
| 11MMA/80BuA/9MAA | gel/≤6 | gel, ppt./≤1 | gel/≤1 | 7.0 | 2.0 | | 3.5 | |
| 71MMA/20 2EHA/9MAA | .013/7 | .006/7 | .009/7 | 10.0 | 5.7 | 9.0 | 1.0 | Do. |
| 60MMA/31 2EHA/9MAA | .040/15 | | | 10.0 | | | | |
| 57MMA/40 2EHA/3MAA | .195/7 | .018/7 | | 8.5 | 9.5 | | 9.3 | |
| 51MMA/40 2EHA/9MAA | .020/7 | −.003/7 | −.010/7 | 9.0 | 2.0 | 7.0 | 2.0 | |
| 47MMA/40 2EHA/13MAA | .170/7 | −.010/7 | .223/7 | 5.0 | 5.0 | 7.0 | 2.0 | |
| 40MMA/40 2EHA/20MAA | | gel | | | | | | |
| 49MMA/45 2EHA/6MAA | | | .024/21 | | | | 9.0 | |
| 46MMA/45 2EHA/9MAA | | | .003/21 | | | | 10.0 | |
| 47MMA/47 2EHA/6MAA | | | .050/15 | | | | 7.0 | |
| 41MMA/53 2EHA/6MAA | | | .055/21 | | | | 9.0 | |
| 38MMA/53 2EHA/9MAA | | | .030/21 | | | | 9.0 | |
| 37MMA/60 2EHA/3MAA | .234/7 | .027/7 | | 9.8 | 5.0 | | 10.0 | |
| 27MMA/60 2EHA/13MAA | .095/7 | .010/7 | .106/7 | 3.0 | 1.7 | 3.7 | 2.0 | |
| 77MMA/20EA/3MAA | gel/1 | .125/1 | | 10.0 | 10.0 | | 9.0 | Do. |
| 74MMA/20EA/6MAA | .035/7 | .004/7 | | 9.7 | 10.0 | | 5.0 | Do. |
| 71MMA/20EA/9MAA | .072/7 | .001/7 | .017/7 | 10.0 | 10.0 | 9.0 | 1.0 | Do. |
| 56MMA/35EA/9MAA | −.001/15 | | .088/15 | 9.0 | | 10.0 | | Do. |
| 57MMA/40EA/3MAA | gel/1 | ~1.1/7 | | 9.7 | 10.0 | | 2.0 | |
| 18MMA/76EA/6MAA | gel/≤1 hr | | gel/1 | | | | | |
| 15MMA/76EA/9MAA | gel/1 | | | | | | | |
| 71MMA/20PrA/9MAA | .069/7 | .005/7 | .013/7 | 10.0 | 9.0 | 9.0 | 2.0 | Do. |
| 51MMA/40PrA/9MAA | .058/7 | | | 7.0 | | | 1.0 | |
| 55MMA/36AmylA/9MAA | .040/7 | | | 9.5 | | | 3.0 | |
| 57MMA/34HexA/9MAA | .043/7 | | | 9.3 | | | 3.0 | |
| 59MMA/32Hept.A/9MAA | .044/7 | | | 9.0 | | | 3.0 | |
| 46S/45EA/9MAA | .512/7 | .126/22 | gel/1 | | | | | |
| 37S/60EA/3MAA | .30/7 | .039/7 | | 9.0 | 9.5 | | 5.0 | |
| 31S/60EA/9MAA | .070/7 | .105/7 | gel/1 | 9.0 | 9.0 | 9.0 | 1.0 | |
| 91S/9MAA | gel/5 | .16/7 | gel/16 | 10.0 | 10.0 | 10.0 | 10.0 | Do. |
| 11S/80EMA/9MAA | .148/7 | .012/7 | .018/7 | 9.0 | 9.7 | 8.3 | 2.0 | |
| 15S/80EMA/5MAA | .156/7 | .025/7 | | 10.0 | 10.0 | | 1.0 | |
| 51S/40BuA/9MAA | | .11/7 (ppt. 9) | gel/1 | | 9.0 | 10.0 | | |
| 49S/45 2EHA/6MAA | gel/1 | | gel/1 | | | | | |
| 38S/53 2EHA/9MAA | gel/1 | | gel/1 | | | | | |
| 60MMA/40 2EHA | .41/7 | .250/7 | | 10.0 | 9.0 | | 10.0 | |
| 70MMA/30 2EHA | .33/7 | .106/7 | | 10.0 | 9.0 | | 10.0 | |
| 80MMA/11VA/9MAA | .018/7 | .007/7 | | 9.7 | 9.0 | | 1.0 | Do. |
| 40MMA/51VA/9MAA | .012/7 | −.045/7 | | 7.7 | 5.0 | | 1.0 | |
| 71EMA/20VT/9MAA | .108/7 | .016/7 | .012/7 | 10.0 | 9.0 | 9.0 | 2.0 | Do. |
| 51EA/40BuA/9MAA | gel | gel ppt | solid gel | 3.0 | | | | |
| 31EA/60BuA/9MAA | gel | gel ppt | solid gel | 5.0 | | | 2.0 | |

The differences in stability between Formulation I and Formulations II and III as shown in Table III above are attributed in part to the presence of polyethylene wax in Formulation I. The improved stability in Formulation II is due in part to the low metal content of Formulation II, i.e., the ratio of zirconyl ions to total polymer and resin carboxyl equivalents is 0.15 in Formulation II and 0.30 in Formulations I and III.

The effect of reducing the zirconyl concentration is shown when the "Single Coat Resistance" data obtained for Formulation II is compared with Formulations I and III.

It should be noted that those polymers which have minimum film forming temperatures greater than about 80° C. formed crazed films as shown above.

When a commercially available detergent solution was used, "Single Coat Resistant" values for films obtained from the coating composition of the invention were about ten.

The "Multiple Coat Removal" test was designed to show comparative ease in coating removal of aged built-up films. Therefore, complete film removal was not required. Complete film removal of the films of the invention can be obtained if the test is continued.

All the films of the invention tested under the "Single Coat Resistance" test were removed with a complexing agent/alkaline aqueous medium, i.e., the solution used in the "Multiple Coat Removal" test.

*Example 4*

The following are formulations of coating compositions having various resin to polymer ratios and various zirconyl to total carboxyl ratios:

(a) A coating composition having a resin to polymer weight ratio of 40:60 containing about 10.2% solids and having a pH of about 7.7 comprising:

| | Grams |
| --- | --- |
| Deionized water | 157.50 |
| Tall oil fatty acid (acid value 190–200 rosin acid content 5% maximum) | 0.54 |
| Triethanol amine | 0.27 |
| Durez 19788 resin cut (14.96% solids having a number average molecular weight of about 720 and an acid value of about 200) having a pH of about 7.8 | 65.60 |
| Triton X–405 (an octyl phenyl polyethoxy ethanol having 40 moles of ethylene oxide per mole of emulsifier) | 1.10 |
| Tris-(butoxyethyl) phosphate | 0.52 |
| Propylene glycol | 1.18 |
| Ethylene glycol | 0.59 |
| A polymer containing methyl methacrylate 60%/2-ethylhexyl acrylate 31%/methacrylic acid 9% (34.86% solids) | 42.30 |
| Ammonium zirconyl carbonate ($ZrO^{++}/CO_2^{-}=0.5$) | 30.40 |
| | 300.00 | parts of a 28% aqueous solution of sodium lauryl sulfate emulsifier, and 70 parts of the admixture of monomers were charged into a reaction flask. The flask was then flushed with nitrogen for 30 minutes before a catalyst mixture composed of one part $(NH_4)_2S_2O_8$ and one part $NaHSO_3$ was added. Heating of the reaction flask was begun. When the reaction mixture reached 30° C., addition of the remaining monomer charge was begun. The addition took 1¾ hours. During this time, the temperature was raised gradually to approximately 60° C. Then the temperature was raised to 90–92° C. and held at this temperature for 30 minutes before cooling. A stable emulsion polymer was obtained. The polymer had an MFT less than 20° C. The reaction product contained 35% solids.

*Example 2*

A high molecular weight, polyligand, emulsion polymer containing methyl methacrylate, 60%, 2-ethylhexyl acrylate, 31%, methacrylic acid, 9%, was prepared in a method substantially similar to that described in Example 1 above.

A stable emulsion polymer was obtained. The polymer had an intrinsic viscosity at 25° C. in 2-butanone of 0.77 deciliters/gram which corresponds to an estimated viscosity average molecular weight of about 427,000, using the constants for polymethylmethylacrylate polymer in 2-butanone at 25° C. The polymer had an MFT of 55° C. The reaction product contained 35% solids.

*Example 3*

A series of polymers were prepared in a manner similar to that described in Example 1 and added to three different aqueous coating composition formulations (Formulations I, II, and III which are described in detail below). These coating compositions also contained a resin, ammonium zirconyl carbonate, leveling aids, plasticizers, emulsifiers, and other film supplements. The stability of these coating compositions was observed at about 51° C. after varying periods of time and the changes in optical density were determined in the manner described hereinabove. (See Table III below.) The pH of each of these compositions was adjusted to about 7.7.

These various coating compositions were applied to black vinyl tile by hand using a soaked cheesecloth. The "Single Coat Resistance" of these films after aging for 72 hours at ambient conditions was observed using a Gardner Straight Line Washability and Abrasion Machine, Model 105-A, (see Table III below). The treated tile was subjected to 25 cycles with the Gardner machine using a felt pad soaked with an aqueous solution containing a commercially available cleaning powder. This cleaning process was designed to simulate the most extreme household cleaning conditions. For example, the commercially available cleaning powder is considered to be one of the most effective cleaners commercially available. The cleaning powder contains trisodium phosphate, sodium carbonate, and dodecyl benzene sulfonate. The powder was diluted to about 1.25% solids.

Multiple coats of the Formulation I compositions were also applied to a black vinyl tile in a manner similar to that described above for obtaining the single coat resistance data. After each coating application the film was allowed to dry for about 24 hours at about 45° C. Five coatings were applied. Twenty-four hours after the fifth coating application the coated vinyl tile was treated with the Gardner machine in the manner described above under the single coat resistance discussion, except that a brush was substituted for the felt pad and 100 cycles were used rather than 25. The "Multiple Coat Removal" data obtained is set forth in Table III below. The cleaning solution described above was used, however, about three parts by weight of concentrated ammonium hydroxide (28% by weight $NH_3$) (complexing agent/ alkaline aqueous medium) was added per 100 parts of the cleaning solution. Other alkaline aqueous complexing agents have also been used including solutions of sodium hydroxide, tetramethylammonium hydroxide, $(NH_4)_2HPO_4$, and $(NH_4)_2CO_3$. The latter two substances were combined with ammonium hydroxide in the complexing agent/alkaline aqueous medium. The "Single Coat Resistance" and "Multiple Coat Removal" values are subjective, where ten equals complete resistance of the film to the treating solution and one equals complete removal of the film by the treating solution.

The film appearance on drying at ambient conditions is also recorded in Table III. Unless the film is described as crazed it was acceptable.

The various polymers studied are listed in Table III in abbreviated form with the percent by weight of each monomer component listed immediately prior to the monomer abbreviation. The abbreviations are MMA= methyl methacrylate, BuA=butyl acrylate, MAA=methacrylic acid, 2EHA=2-ethylhexyl acrylate, EA=ethyl acrylate, PrA=n-propyl acrylate, PrMA=propyl methacrylate, AmylA=amyl acrylate, HexA=hexyl acrylate, HeptA=heptyl acrylate, S=styrene, EMA=ethyl methacrylate, VA=vinyl acetate, VT=vinyl toluene.

The three formulations used contained the following:

FORMULATION I

| Component: | Parts |
|---|---|
| Polymer (at 35% solids) | 52.20 |
| Resin cut (esterified rosin/maleic anhydride solutions containing about 16.6% non-volatile) comprising Durez 19788 and aqueous ammonia, having a pH of about 7.8 | 59.20 |
| Ammonium zirconyl carbonate | 19.50 |
| Water | 94.20 |
| Wax (19.16% non-volatile) | 15.20 |
| Tall oil fatty acid (acid value 190–200, rosin content 5% maximum) | 0.69 |
| Triethanol amine | 0.31 |
| Tris-(butoxyethyl) phosphate | 1.05 |
| Propylene glycol | 4.10 |
| Ethylene glycol | 2.05 |
| Triton X–405 (see Example 4a) | 1.50 |
| | 250.00 |

FORMULATION II

| Component: | Parts |
|---|---|
| Polymer (at 35% solids) | 50.10 |
| Resin cut (esterified rosin/maleic anhydride solution containing about 16.6% non-volatile) comprising Durez 19788 and aqueous ammonia, having a pH of about 7.8 | 56.40 |
| Ammonium zirconyl carbonate | 9.25 |
| Water | 78.50 |
| Tris-(butoxyethyl) phosphate | 0.55 |
| Propylene glycol | 2.67 |
| Ethylene glycol | 1.33 |
| Triton X–405 | 1.20 |
| | 200.00 |

FORMULATION III

| Component: | Parts |
|---|---|
| Polymer (at 35% solids) | 50.10 |
| Resin (same as in II above) | 56.40 |
| Ammonium zirconyl carbonate | 18.50 |
| Water | 69.25 |
| Tris-(butoxyethyl) phosphate | 0.55 |
| Propylene glycol | 2.67 |
| Ethylene glycol | 1.33 |
| Triton X–405 | 1.20 |
| | 200.00 |

The resin to polymer weight ratio in all formulations was 35:65. The ratio of zirconyl ions to total polymer (c) A coating composition having a resin to polymer weight ratio of 35:65 containing approximately 11.4% solids and having a pH of 7.8 comprising:

| | Grams |
|---|---|
| Deionized water | 161.50 |
| A styrene/acrylic acid resin cut (20.33% solids having a number of average molecular weight of about 2,500 and an acid value of 173), having a pH of about 8.40 | 24.60 |
| Durez 19788 resin cut (as described in Example 5(a) | 34.10 |
| Tris-(butoxyethyl) phosphate | 0.90 |
| Triton X–405 (as described above) | 1.05 |
| Ethylene glycol | 5.40 |
| A polymer containing ethyl methacrylate 80%/styrene 11%/methacrylic acid 9% (34.90% solids) | 26.70 |
| A polymer containing methyl methacrylate 60%/2-ethylhexyl acrylate 31%/methacrylic acid 9% (34.87% solids) | 26.70 |
| Ammonium zirconyl carbonate ($ZrO^{++}/CO_2^{-}=0.30$) | 19.05 |
| | 300.00 |

Example 6

The effect of changing the pH of a coating composition containing a polymer comprised of 60% methyl methacrylate/31% 2-ethylhexyl acrylate and 9% methacrylic acid in a formulation substantially similar to Formulation III described in Example 3 above was observed.

The formulation as initially prepared had a pH of about 7.55 and a change in optical density after ten days at about 51° C. of about 0.006. When the pH of this composition was raised to about 9.00 by the addition of aqueous concentrated ammonia, the change in optical density after ten days at about 51° C. was 0.022. When the pH of this composition was increased to about 9.2, the composition was not stable, i.e., by the end of ten days the composition had gelled.

When the pH of the composition was reduced to a pH of about 6.5 using dilute hydrochloric acid, the composition gelled.

Example 7

A coating composition of the invention such as described in Formulation I containing a polymer containing methyl methacrylate 60%, 2-ethylhexyl acrylate 31%, and methacrylic acid 9% was compared side-by-side with a commercially available floor coating product (which contained emulsion polymers and alkali soluble resins and was free from zirconyl metal and will be referred to hereinafter as Commercial Product No. 1) and in an extensive test under controlled use conditions in several households on various tile substrates. Films were built-up and maintained in the following manner: One coat of each composition was applied to a portion of the substrate once a week for the first seven to eight weeks. Thereafter, applications were made bi-weekly until a total of ten to twelve coats were built up. Prior to each application the films were washed with the cleaning solution described in Example 3 above under the "Single Coat Resistance" discussion. The Commercial Product No. 1 films were dulled and/or removed by this treatment; films of the zirconyl-containing product were not affected in any way.

After the fourth or fifth coats had been applied to each substrate, the zirconyl-containing product film had built up to a high gloss (i.e., wet or glassy appearance) whereas Commercial Product No. 1 did not do this. Further gloss increase was not observed. The films of the invention were easily and completely removed with a complexing agent/alkaline aqueous medium.

Example 8

Three coating compositions including a Formulation I product such as described in Example 7 above, a commercially available floor coating product (which contained emulsion polymers, alkali soluble resins and was free from zirconyl metal and referred to hereinafter as Commercial Product No. 2) and a composition similar to the Formulation I product described in Example 7 above except that it was free from zirconyl ions were tested for resistance to indentation under constant load.

These coating compositions were placed on glass substrates and formed films greater than 200μ thick. These films were aged for 28 days under ambient conditions. Then the films were tested with a Tukon Microhardness Tester (Machine No. MO–446, Microscope No. HD–8263). Five readings (in filar units) were taken at different locations on each film. The mean average of these filar units was converted to a Knoop hardness number. As shown in Table IV the zirconyl-containing film had a relatively high Knoop hardness value in comparison with the non-zirconyl film and Commercial Product No. 2, thus indicating a high resistance to indentation. This property would be indicative of improved film resistance to marring and is one aspect of the unique structural integrity of the films of the invention.

TABLE IV

| Coating Composition | Constant Load in Grams | Knoop Hardness No. |
|---|---|---|
| Commercial Product No. 2 | 25 | 6.4 |
| Zirconyl-containing coating composition (See Example 7) | 25 | 9.4 |
| Zirconyl-free coating composition | 25 | 3.4 |

Example 9

A further aspect of the structural integrity of the films of the invention was considered by observing the durability, i.e., resistance to foot traffic attrition, of these films. In this study the durability of a film obtained from a Formulation I coating composition such as described in Example 7 (hereinafter referred to as Formulation I) was compared with that of Commercial Product No. 1. Durability data was based on a beta gaging method of film thickness which depends upon absorption by the films of beta emission provided by an external radiation source. The radioactive source (Ni 63 beta transmission) resided in the substrate supporting the film. Film attrition was measured by the increase in emission transmission as the film eroded. See S. Goldspiel et al., "Radioisotope Tagged Electroless Nickel Substrates for the Study of Film Coatings," Material Research and Standard, 3, No. 7, 562 (1963).

Radioactive nickel dimethylglyoxime (NiDMG) was prepared by reacting a combination of 5.95 g. of $NiCl_2 \cdot 6H_2O$ carrier and 328 μc. (8.74 mg. of $Ni^{63}Cl_2$ with a stoichiometric (+10% excess) quantity of dimethylglyoxime in alkaline solution. The purified pigment was formulated into a vinyl lacquer having the following compositions:

| | Percent |
|---|---|
| Bakelite VYHH vinyl solution resin | 15.0 |
| Dioctyl phthalate | 1.5 |
| Radioactive NiDMG | 2.5 |
| Methyl ethyl ketone solvent | 41.0 |
| Toluene solvent | 30.0 |
| Naphtha | 10.0 |

(b) A coating composition having a resin to polymer weight ratio of 30:70 containing about 26.6% solids and having a pH of about 7.6 comprising:

| | Grams |
|---|---|
| Deionized water | 10.04 |
| Tall oil fatty acid (as described above) | 0.55 |
| Triethanol amine | 0.27 |
| Styrene/acrylic acid resin cut (19.66% solids having a number average molecular weight of about 2,270 and an acid value of about 192) having a pH of about 9.15 | 31.40 |
| Triton X–405 (as described above) | 1.11 |
| Tris-(butoxyethyl) phosphate | 0.53 |
| Propylene glycol | 2.40 |
| Ethylene glycol | 1.20 |
| A polymer containing methyl methacrylate 51%/2-ethylhexyl acrylate 40%/methacrylic acid 9% (34.87% solids) | 47.40 |
| Ammonium zirconyl carbonate ($ZrO^{++}/CO_2^{=}=0.1$) | 5.10 |
| | 100.00 |

(c) A coating composition having a resin to polymer weight ratio of 90:10 containing about 15.4% solids and having a pH of about 7.6 comprising:

| | Grams |
|---|---|
| Deionized water | 10.60 |
| Tall oil fatty acid (as described above) | 0.50 |
| Triethanol amine | 0.25 |
| Styrene/acrylic acid resin cut (14.28% solids) having a number average molecular weight of about 3,460 and an acid value of about 190, having a pH of about 7.55 | 157.40 |
| Tris-(butoxyethyl) phosphate | 0.75 |
| Propylene glycol | 2.67 |
| Ethylene glycol | 1.33 |
| A polymer containing methyl methacrylate 31%/2-ethylhexyl acrylate 60%/methacrylic acid 9% (34.86% solids) | 7.30 |
| Ammonium zirconyl carbonate ($ZrO^{++}/CO_2^{=}=0.2$) | 19.20 |
| | 200.00 |

(d) A coating composition having a resin to polymer weight ratio of about 34.6:65.4 containing about 14.1% solids and having a pH of about 8.1 comprising:

| | Grams |
|---|---|
| Water | 47.57 |
| Tall oil fatty acid (acid value 190–200 rosin acid content 5% maximum) | 0.28 |
| Ammonia (28%) | 0.14 |
| Alresat 618C resin cut at 20% solids, having a pH of about 8.6 | 19.57 |
| Tris-(butoxyethyl) phosphate | 0.70 |
| Diethylene glycol monomethyl ether | 1.50 |
| Ethylene glycol | 1.50 |
| Rohm and Haas polymer E-231 comprising a polymer blend containing the following monomers: methyl methacrylate about 20%, butyl acrylate about 20%, styrene about 30%, acrylonitrile about 19.5%, and methacrylic acid about 5.8% (at about 40% solids) | 18.20 |
| Ammonium zirconyl carbonate (12% solids) ($ZrO^{++}/CO_2^{=}=0.26$) | 3.72 |
| Phenyl mercuric acetate (10% solids) | 0.02 |
| Polyethylene wax emulsion (20% solids) | 6.80 |
| | 100.00 |

(e) A coating composition having a resin to polymer weight ratio of about 34.6:65.4 containing about 13.7% solids and having a pH of about 7.8 comprising:

| | Grams |
|---|---|
| Water | 43.09 |
| Tall oil fatty acid (acid value 190–200 rosin acid content 5% maximum) | 0.42 |
| Triethanol amine | 0.15 |
| Alresat 618C resin cut at 15.2% solids, having a pH of about 8.3 | 24.85 |
| Tris-(butoxyethyl) phosphate | 0.98 |
| Propylene glycol | 1.50 |
| Diethylene glycol monoethyl ether | 1.50 |
| Rohm and Haas polymer E-231 at 40% solids | 17.50 |
| Ammonium zirconyl carbonate at 12% solids ($ZrO^{++}/CO_2^{=}=0.15$) | 3.16 |
| Polyethylene wax emulsion (about 20% non-volatile) | 6.65 |
| Formaldehyde (37%) | 0.20 |
| | 100.00 |

*Example 5*

The following are formulations of coating compositions containing mixtures of condensation-type and addition-type resins with various polymers and mixtures of polymers:

(a) A coating composition having a resin to polymer weight ratio of 40:60, containing approximately 15.3% solids and having a pH of 7.9 comprising:

| | Grams |
|---|---|
| Deionized water | 69.88 |
| Styrene/acrylic acid resin cut (19.66% solids having a number average molecular weight of about 2,270 and an acid value of 192), having a pH of about 9.15 | 27.40 |
| Durez 19788 resin cut (14.96% solids having a number average molecular weight of about 720 and an acid value of 200), having a pH of about 7.8 | 35.50 |
| Tris-(butoxyethyl) phosphate | 0.84 |
| Ethylene glycol | 1.67 |
| Propylene glycol | 3.33 |
| A polymer containing methyl methacrylate 55%/butyl acrylate 40%/acrylic acid 5% (34.87% solids) | 46.50 |
| Ammonium zirconyl carbonate ($ZrO^{++}/CO_2^{=}=0.25$) | 14.87 |
| | 200.00 |

(b) A coating composition having a resin to polymer weight ratio of 50:50 containing approximately 19% solids and having a pH of 7.7 comprising:

| | Grams |
|---|---|
| Deionized water | 30.80 |
| Durez 19788 (as described above) | 161.00 |
| Tris-(butoxyethyl) phosphate | 1.50 |
| Triton X-405 (as described above) | 2.20 |
| Ethylene glycol | 7.80 |
| A polymer containing ethyl methacrylate 80%/styrene 11%/methacrylic acid 9% (34.90% solids) | 20.80 |
| A polymer containing methyl methacrylate 51%/2-ethylhexyl acrylate 40%/methacrylic acid 9% (34.87% solids) | 48.70 |
| Ammonium zirconyl carbonate ($ZrO^{++}/CO_2^{=}=0.20$) | 27.20 |
| | 300.00 |

The durability evaluation was conducted in the following manner. Forty gaging sources were prepared consisting of 2⅝" diameter vinyl conductive tile disks coated with the radioactive NiDMG pigmented vinyl lacquer, such as described above. The beta surface activity of these sources was determined to serve as a "100% beta transmission" value in later computations.

These sources were inserted into the holes of two 45" square test panels surfaced with centerhole vinyl tile, and 70 ml. of Commercial Product No. 1 was applied to each panel with an initially dry chenille applier. After 18 hours dry time at ambient conditions a second coat of Commercial Product No. 1 was applied similarly and allowed to dry for 7 days. The gaging sources were then removed from the polish application panels and their beta surface activity redetermined to establish the beta absorption of the total Commercial Product No. 1 film applied. In order to relate radioactivity to film thickness for each gaging source, calibration curves were obtained by plotting log "Percent $Ni^{63}$ Beta Transmission" vs. "Percent of Total Polish Film" for each gaging source (see FIGS. 2 and 3). Upon completion of the test this procedure was repeated using the same forty gaging sources which were cleaned free from Commercial Product No. 1 and then coated with the Formulation I coating described above. However, there was a 25 hour interval before the second Formulation I coat was applied and the two coats were cured for 14 days.

The Commercial Product No. 1 coated gaging sources were inserted into corresponding 2⅝" diameter holes of a traffic-test floor consisting of 40 centerhole vinyl tile applied two tiles wide by 20 tiles long to a plywood backing measure 1.5' x 15'. Seventeen personnel wearing captive footwear (i.e., used only on the test panels) walked 20,000 lengthwise passages across the test floor which is equivalent to 56.8 miles. The test was recessed at 10,000 passages and the gaging source beta surface activities were determined to evaluate film erosion to this point of the test. The fraction of Commercial Product No. 1 film remaining for each gaging surface was established by taking the observed beta transmission value after 10,000 passages and relating this value to the "Percent of Total Polish Film" remaining as shown in the respective calibration curve of FIG. 2. These values, percent of total polish film remaining, were then plotted as the ordinates against the geographic location of the particular gaging source in the test floor as the abscissa to provide a scale profile of the Commercial Product No. 1 film thickness along the length of the test floor (see FIG. 4). This profile showed definite minimums of film wear at approximately 30 inch intervals, a pattern directly related to the length of stride in walking the floor. These wear maxima and minima were sharpest near the ends of the test floor and became more diffuse near the center where the opportunity for randomization of stride increases. The greatest film wear was observed at the extreme ends of the test floor, and it was necessary to remove one of the end gaging sources from the test because the polish film had been worn through to the substrate.

The wear test was resumed for an additional 10,000 passages across the test floor and the final results were determined similarly. The final test floor film profile was almost identical in shape to that observed at the test mid-point although displaced vertically due to added wear (see FIG. 4). Film erosion for the completed test ranged from 0 to 59% with the greatest erosion again being observed at the ends of the test floor. This greater floor-end erosion is attributed to a combination of traffic pattern, and a tendency for some test participants to pivot slightly as they alighted from the test floor and turned around for the return trip in the restricted space available beyond the ends of the test floor. The average erosion for the 40 gaging sources was 15.6%. This figure was reduced to 13.3% erosion by exclusion of results for six sources at each end of the test floor where anamalous wear was observed.

Similarly 40 gaging sources of Formulation I films were evaluated for resistance to foot traffic attrition after 20,000 passages. Film erosion for the 20,000 passage Formulation I film test ranged from 0 to about 15.5%. The greatest erosion occurred at the ends of the test floor, as was also observed for the Commercial Product No. 1 film. The average Formulation I film erosion for the 40 gaging sources was 3.7%. This figure is reduced to 3% by exclusion of results for six sources at each end of the test floor where anomalous wear possibly occurred. A plot representing a scale profile of the Formulation I thickness along the length of the test floor after 20,000 passages of traffic is also shown at FIG. 4 with the profile of the Commercial Product No. 1 film for comparison. The superior Formulation I durability is readily apparent from the vertical displacement of these profiles. Fair parallelism is observed between the Formulation I—Commercial Product No. 1 odd numbered tile profile and the Formulation I—Commercial Product No. 1 even numbered tile profile.

EXAMPLE 10

The resistance of the films of the invention to boiling water was observed by placing on a quartz substrate: (1) a zirconyl-containing film such as described in Example 8 supra; (2) a similar film which was free from zirconyl ions; and (3) and (4) two films obtained from commercially available, metal-free floor coating compositions, i.e., Commercial Product No. 1 and Commercial Product No. 2. The quartz substrate containing each of the films was placed in a Petri dish and immersed in boiling water. Upon cooling, the water was withdrawn and replaced with further boiling water. The results are set forth in Table V below.

TABLE V

| Film | Number of Treatments with boiling water | Status of Film |
|---|---|---|
| Zirconyl-containing | 6 | Not removed. |
| Zirconyl-free | 1 | Removed. |
| Commercial Product No. 1 | 1 | Do. |
| Commercial Product No. 2 | 1 | Do. |

EXAMPLE 11

The resistance to solution of a zirconyl-containing film of the invention such as described in Example 8 supra was observed along with the limited and regular distortion obtained under swelling and/or shrinking conditions. A similar film which did not contain zirconyl ions and films obtained from certain commercially available coating compositions (Commercial Products 1 and 2) were also observed under these conditions.

Small rectangular portions of each of these films were placed in a Petri dish. Initially the area of each film was established by means of a comparison microscope. Then each film was covered with solvent and the changes in surface area were monitored. Additional solvent was added as required to maintain a constant liquid level in the Petri dish.

The change in area of the film including swelling, shrinking, and dissolving and the distortion obtained with solvents having various solubility parameters is set forth in Table VI below.

TABLE VI
[Change in area in percent a]

| | n-Heptane (solubility parameter 8.6) | Chloroform (solubility parameter 9.3) | Methylene chloride (solubility parameter 9.7) | Acetone (solubility parameter 10.0) | Toluene (solubility parameter 8.9) |
|---|---|---|---|---|---|
| Zirconyl-containing | b 0.7 | b 135 | b 100 | b 51 | b 12.9 |
| Zirconyl-free | c −17.0 | d 30 | d 37 | d 26 | d 32 |
| Commercial Product No. 1 | c −2.7 | d 48 | | d 148 | |
| Commercial Product No. 2 | | d 3.0 | | d 30 | | a The change in percent is either at equilibrium or when a maximum value is attained before solution. Where shrinking occurs, values were obtained after twice the normal time period used in the experiment.
b These values are at equilibrium swellings.
c The values of shrinkage are values obtained after a long time period and are not necessarily equilibrium values.
d The values of the swelling are maximum values obtained before reduction in volume occurred by solution.

The zirconyl film reached an equilibrium value in each solvent. Outlines of the film which initially were rectangular in each solvent became smoothly curved. Leaching of the surfactant from the film occured with methylene chloride.

In the zirconyl-free film shrinkage occurred with n-heptane and the value reported at the end of two hours was continuing to decrease. In toluene, equilibrium was achieved in 1.2 hours. In the other solvents the value reported is at maximum swelling which was irregular before solution occurred. Leaching of emulsifier occurred with methylene chloride.

With respect to Commercial Products 1 and 2 the films swelled and dissolved in the various solvents, except that Commercial Product 1 underwent shrinkage in n-heptane.

The swelling behavior of the films of the invention is unique and unobvious in that all of the zirconyl-containing films reach a maximum equilibrium swelling value and at this value resist dissolving. This condition of maximum swelling is attained by a regular change in shape as contrasted to the irregular phenomenon which occurs with various other films as described in the discussion of Table VI above.

*Example 12*

The structural integrity of the films of the invention was further observed by comparing the ultrasonic impedometry curve obtained from a zirconyl-containing film, with the ultrasonic impedometry curve obtained from a similar film which did not contain zirconyl ions and from a film obtained from a commercially available coating composition (Commercial Product 2).

The ultrasonic impedometry technique used was similar to that described in detail by R. R. Meyers in Official Digest Federation Society, Paint Technology, vol. 33, p. 940 et seq. (1961), and by R. R. Meyers et al. in "Journal of Applied Polymer Science," vol. 8, pp. 755–764 (1964). Ultrasonic impedometry provides a method for continuously monitoring film development including the changes that take place: (a) at the substrate/film interface, (b) throughout the film, and (c) upon aging and/or exposure to water. The representative results obtained are set forth in FIG. 1.

It should be noted that the drying time for all these films was substantially the same and that on drying all these films had substantially the same attenuation (in decibels). Upon the addition of water by means of a moistened blotter, the zirconyl-containing film: (1) showed a slight decrease in attenuation (attenuation Δ decibels), however, the adhesion at the film/substrate interface was not affected. In contrast, the non-zirconyl-containing film (2) attenuation went to 0 rapidly indicating that there was film failure. Similar results were obtained with the film obtained from Commercial Product 2 (3). The addition of water is indicated in the drawing by $H_2O$ at about 23, 24, and 25 hours for films 3, 1, and 2 respectively. Upon removal of the water, i.e., removal of the moistened blotter, the film recovered and healed in each instance as shown by the attenuation obtained.

*Example 13*

The following is an example of a coating composition of the invention suitable for use as a protective coating for metal.

| Component: | Parts |
|---|---|
| A polymer containing methyl methacrylate 60%/2-ethylhexyl acrylate 31%/methacrylic acid 9% (34.9% solids) | 70.00 |
| Durez 19788 (see Example 5a) (17% solids), having a pH of about 7.8 | 77.00 |
| Water | 73.00 |
| Tall oil fatty acid | 0.75 |
| Diethylamino ethanol | 0.68 |
| Tris-(butoxyethyl) phosphate | 0.85 |
| Ethylene glycol | 6.10 |
| Triton X–405 | 1.12 |
| Ammonium zirconyl carbonate ($ZrO^{++}/CO_2^{-}$=0.3) | 20.50 |
| | 250.00 |

The foregoing composition had a pH of about 7.7, a resin to polymer ratio of about 35:65 and contained approximately 16% solids. This composition was applied to metals such as chrome as an all-weather protectant. After prolonged periods of aging the film was removed from the chrome substrate by the application of an aqueous mixture containing an alkaline complexing agent.

While various embodiments of this invention are described, it should be appreciated that the invention is not restricted thereto, and that it is intended to cover all modifications of the invention which it will be apparent to one skilled in the art and which come within the scope of the appended claims.

I claim:

1. A stable aqueous coating composition having a pH from greater than 7 to about 9 and a difference in optical density after seven days at about 51° C. of less than about 0.1 comprising:
   A. an organic film former containing:
   (1) a polyligand emulsion polymer having a minimum film forming temperature of less than about 80° C. consisting essentially of:
   (a) from about 30% to about 80% by weight of a methacrylate monomer having the structural formula

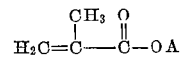

wherein A is a saturated alkyl radical having from one to ten carbon atoms,
   (b) from about 5% to about 10% by weight of a ligand-containing, polymerizable, ethylenically unsaturated monomer having the structural formula

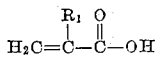

wherein $R_1$ is selected from the group consisting of a hydrogen atom and a methyl radical,
(c) from about 10% to about 60% by weight of a ligand-free, polymerizable, ethylenically unsaturated monomer which is free from methyl groups on the alpha carbon atom having the structural formula $$CH_2=CH-X$$

wherein X is selected from the group consisting of aryl and alkaryl radicals and

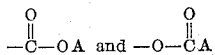

radicals wherein A is as defined above,
(2) a resin cut containing:
   (a) a low molecular weight, polyligand, alkali soluble resin having an acid number from about 140 to about 300, selected from the group consisting of rosin/maleic anhydride/polyol condensation resins having a number average molecular weight from about 600 to about 5,000 and styrene/acrylic acid resins having a number average molecular weight from about 2,000 to about 5,000 and
   (b) an aqueous base, at least about 50% of the moles of which are comprised of ammonia,
B. a zirconyl-fugitive ligand complex which is capable of undergoing ligand transfer with ligands of the film former containing:
   (1) a zirconyl ion,
   (2) carbonate ions, and
   (3) ammonium ions.

2. A composition according to claim 1 wherein the resin is a rosin/maleic anhydride/polyol condensation resin.

3. A composition according to claim 1 wherein the resin is a styrene/acrylic acid resin.

4. A composition according to claim 1 containing from about 40% to about 70% by weight methacrylate monomer, from about 6% to about 9% by weight of the ligand-containing monomer and from about 20% to about 50% by weight of the ligand-free monomer.

5. A composition according to claim 1 wherein the weight ratio of the ligand-containing monomer to the ligand-free monomer is from about 2:1 to about 12:1 and wherein the weight ratio of the methacrylate monomer to the ligand-containing and ligand-free monomers is from about 1:2.3 to about 4:1.

6. A composition according to claim 1 wherein the weight ratio of resin to polymer is from about 20:80 to about 90:10.

7. A composition according to claim 1 containing up to about 10% wax, based on total solids, and up to about 4% tris-(butoxyethyl)phosphate based on total solids.

8. A film on a solid substrate containing captive ligands and having the properties of structural integrity and controlled removability said film comprising:
(1) a polyligand emulsion polymer having a minimum film forming temperature of less than about 80° C. consisting essentially of:
   (a) from about 30% to about 80% by weight of a methacrylate monomer having the structural formula

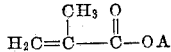

wherein A is a saturated alkyl radical having from one to ten carbon atoms,
(b) from about 5% to about 10% by weight of a ligand-containing, polymerizable, ethylenically unsaturated monomer having the structural formula

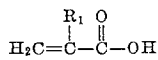

wherein $R_1$ is selected from the group consisting of a hydrogen atom and a methyl radical,
(c) from about 10% to about 60% by weight of a ligand-free, polymerizable, ethylenically unsaturated monomer which is free from methyl groups on the alpha carbon atom having the structural formula $CH_2=CH-X$ wherein X is selected from the group consisting of aryl and alkaryl radicals and

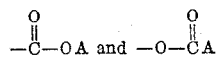

radicals wherein A is as defined above,
(2) a resin cut containing:
   (a) a low molecular weight, polyligand, alkali soluble resin having an acid number from about 140 to about 300, selected from the group consisting of rosin/maleic anhydride/polyol condensation resins having a number average molecular weight from about 600 to about 5,000 and styrene/acrylic acid resins having a number average molecular weight from about 2,000 to about 5,000 and
   (b) an aqueous base, at least about 50% of the moles of which are comprised of ammonia,
(3) a zirconyl-fugitive ligand complex which is capable of undergoing ligand transfer with ligands of the film former containing:
   (a) a zirconyl ion,
   (b) carbonate ions, and
   (c) ammonium ions.

9. A method of removing a film from a solid substrate having captive ligands and having the properties of structural integrity and controlled removability, said film containing:
(1) a polyligand emulsion polymer having a minimum film forming temperature of less than about 80° C. consisting essentially of:
   (a) from about 30% to about 80% by weight of a methacrylate monomer having the structural formula

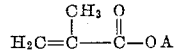

wherein A is a saturated alkyl radical having from one to ten carbon atoms,
(b) from about 5% to about 10% by weight of a ligand-containing, polymerizable, ethylenically unsaturated monomer having the structural formula

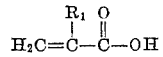

wherein $R_1$ is selected from the group consisting of a hydrogen atom and a methyl radical,
(c) from about 10% to about 60% by weight of a ligand-free, polymerizable, ethylenically unsaturated monomer which is free from methyl groups on the alpha carbon atom having the structural formula $CH_2=CH-X$ wherein X is selected from the group consisting of aryl and alkaryl radicals and

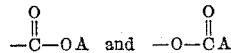

radicals wherein A is as defined above, (2) a resin cut containing:
 (a) a low molecular weight, polyligand, alkali soluble resin having an acid number from about 140 to about 300, selected from the group consisting of rosin/maleic anhydride/polyol condensation resins having a number average molecular weight from about 600 to about 5,000 and styrene/acrylic acid resins having a number average molecular weight from about 2,000 to about 5,000 and
 (b) an aqueous base, at least about 50% of the moles of which are comprised of ammonia,
(3) a zirconyl-fugitive ligand complex which is capable of undergoing ligand transfer with ligands of the film former containing:
 (a) a zirconyl ion,
 (b) carbonate ions, and
 (c) ammonium ions, comprising:
  applying to said film an aqueous alkaline complexing agent comprising an aqueous solution containing a complexing agent selected from the group consisting of ammonium hydroxide, sodium hydroxide, tetramethyl ammonium hydroxide, $(NH_4)_2HPO_4$, $(NH_2)_2CO_3$ potassium and sodium phosphates and carbonates, and mixtures thereof.

References Cited by the Examiner

UNITED STATES PATENTS

| | | | |
|---|---|---|---|
| ,754,280 | 7/1956 | Brown | 260—29.6 |
| 2,778,283 | 1/1957 | Bettoli | 92—40 |
| 2,868,748 | 1/1959 | Frazier | 260—27 |
| 2,901,452 | 8/1959 | West | 260—29.6 |
| 2,972,592 | 2/1961 | Brown | 260—27 |
| 3,072,492 | 1/1963 | Smith | 106—4 |
| 3,079,358 | 2/1963 | Uelzmann | 260—29.7 |
| 3,123,505 | 3/1964 | Popack | 148—6.2 |

FOREIGN PATENTS

| | | |
|---|---|---|
| 572,491 | 3/1959 | Canada. |
| 749,801 | 5/1956 | Great Britain. |

OTHER REFERENCES

Clearfield, Structural Aspects of Zirconium Chemistry, Reviews of Pure and Applied Chemistry, vol. 41, 1964, pages 91–108 made of record.

The Shanco Messenger, January 1961, vol. 4, No. 1, 4 pages relied made of record.

DONALD E. CZAJA, *Primary Examiner.*

LEON J. BERCOVITZ, F. McKELVEY,
*Assistant Examiners.*